United States Patent [19]
Friedman

[11] Patent Number: 5,859,422
[45] Date of Patent: *Jan. 12, 1999

[54] APPARATUS AND METHOD FOR FLEXIBLE GRIPPING OF OBJECTS

[76] Inventor: Glenn M. Friedman, 25 Polk Dr., Hillsdale, N.Y. 12529

[ * ] Notice: The term of this patent shall not extend beyond the expiration date of Pat. No. 5,608,206.

[21] Appl. No.: 794,367

[22] Filed: Feb. 4, 1997

Related U.S. Application Data

[63] Continuation of Ser. No. 509,239, Jul. 31, 1995, Pat. No. 5,608,206.

[51] Int. Cl.$^6$ .................................................. H01J 40/14
[52] U.S. Cl. ................................ 250/208.2; 250/227.11; 250/578.1; 901/47
[58] Field of Search ............................. 250/208.2, 208.1, 250/221, 216, 578.1, 222.1, 227.11, 227.24, 239, 559.33; 623/64; 901/47, 31, 33, 39, 8–10; 414/735, 737

[56] References Cited

U.S. PATENT DOCUMENTS

| | | |
|---|---|---|
| 4,661,039 | 4/1987 | Brenholt .................................. 414/735 |
| 4,818,174 | 4/1989 | Arpiarian et al. ...................... 414/735 |
| 5,176,492 | 1/1993 | Nakamura ............................... 414/730 |

Primary Examiner—Que Le
Attorney, Agent, or Firm—Abelman, Frayne & Schwab

[57] ABSTRACT

An apparatus which securely grasps a wide range of three dimensional objects while relaying digital data about the surface grasped using pneumatically actuated mechanical probes for such grasping and optomechanical encoding for such relaying of data. Such optomechanical encoding employs encoder tubes with columns of patterned slots and holes to selectively transmit light through synthetic plastic fibers. A process of constructing the portion of the apparatus where the optomechanical encoding producing such data occurs which comprises continuously looping the synthetic plastic fibers necessary for light transmission, injecting an adhesive and sealant to enable pneumatic operation of the apparatus, and cutting the adhesive and sealant and synthetic plastic fibers in a circular pattern to allow the passage of the encoder tubes.

19 Claims, 30 Drawing Sheets

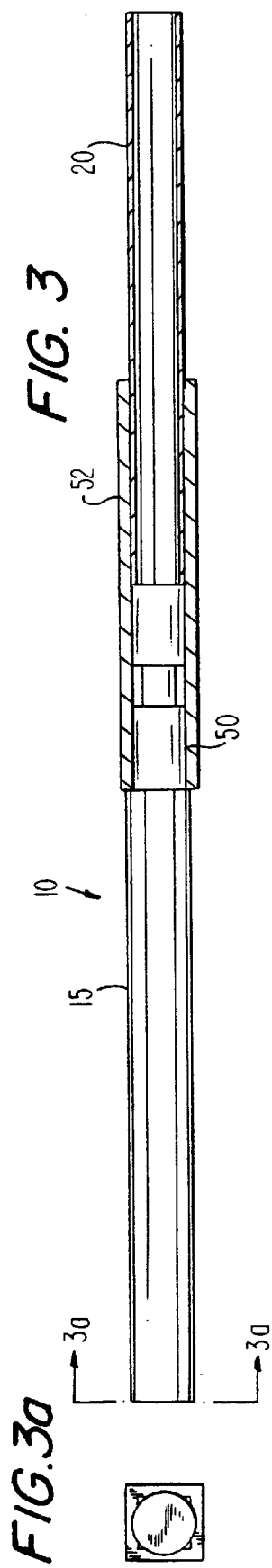

FIG. 7

| | A | B | C | D |
|---|---|---|---|---|
| 1 | 1 | 1 | 1 | 1 |
| 2 | 0 | 1 | 1 | 1 |
| 3 | 0 | 0 | 1 | 1 |
| 4 | 1 | 0 | 1 | 1 |
| 5 | 1 | 0 | 0 | 1 |
| 6 | 0 | 0 | 0 | 1 |
| 7 | 0 | 0 | 0 | 0 |
| 8 | 1 | 0 | 0 | 0 |

| | A | B | C | D |
|---|---|---|---|---|
| 9 | 1 | 0 | 1 | 0 |
| 10 | 0 | 0 | 1 | 0 |
| 11 | 0 | 1 | 1 | 0 |
| 12 | 1 | 1 | 1 | 0 |
| 13 | 1 | 1 | 0 | 0 |
| 14 | 0 | 1 | 0 | 0 |
| 15 | 0 | 1 | 0 | 1 |
| 16 | 1 | 1 | 0 | 1 |

| | A | B | C | D |
|---|---|---|---|---|
| 1 | 0 | 0 | 0 | 0 |
| 2 | 1 | 0 | 0 | 0 |
| 3 | 0 | 1 | 0 | 0 |
| 4 | 1 | 1 | 0 | 0 |
| 5 | 0 | 0 | 1 | 0 |
| 6 | 1 | 0 | 1 | 0 |
| 7 | 0 | 0 | 0 | 0 |
| 8 | 1 | 0 | 1 | 0 |

| | A | B | C | D |
|---|---|---|---|---|
| 9 | 0 | 0 | 0 | 1 |
| 10 | 1 | 0 | 0 | 1 |
| 11 | 0 | 1 | 0 | 1 |
| 12 | 1 | 1 | 0 | 1 |
| 13 | 0 | 0 | 1 | 1 |
| 14 | 1 | 0 | 1 | 1 |
| 15 | 0 | 0 | 1 | 1 |
| 16 | 1 | 0 | 1 | 1 |

FIG. 10

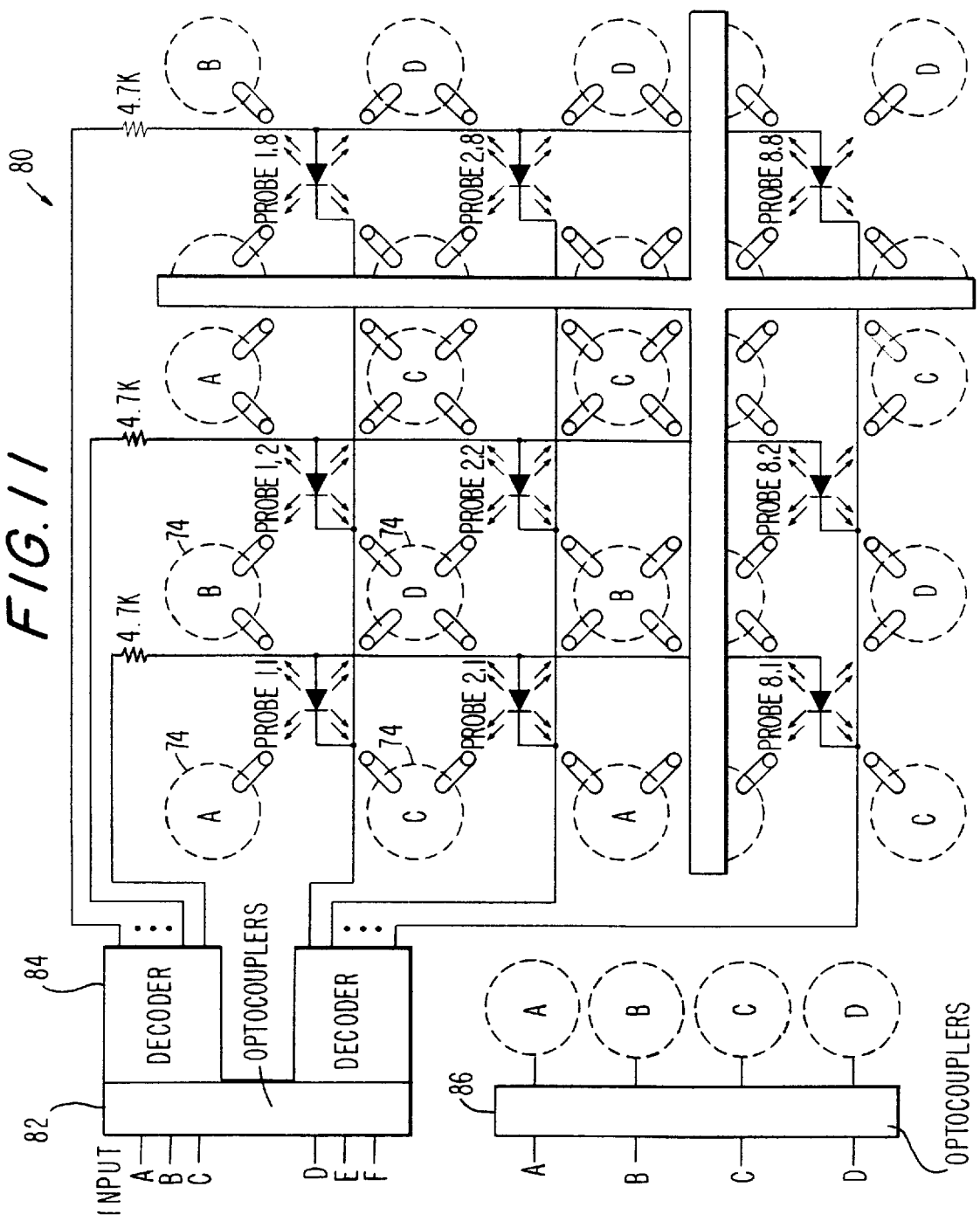

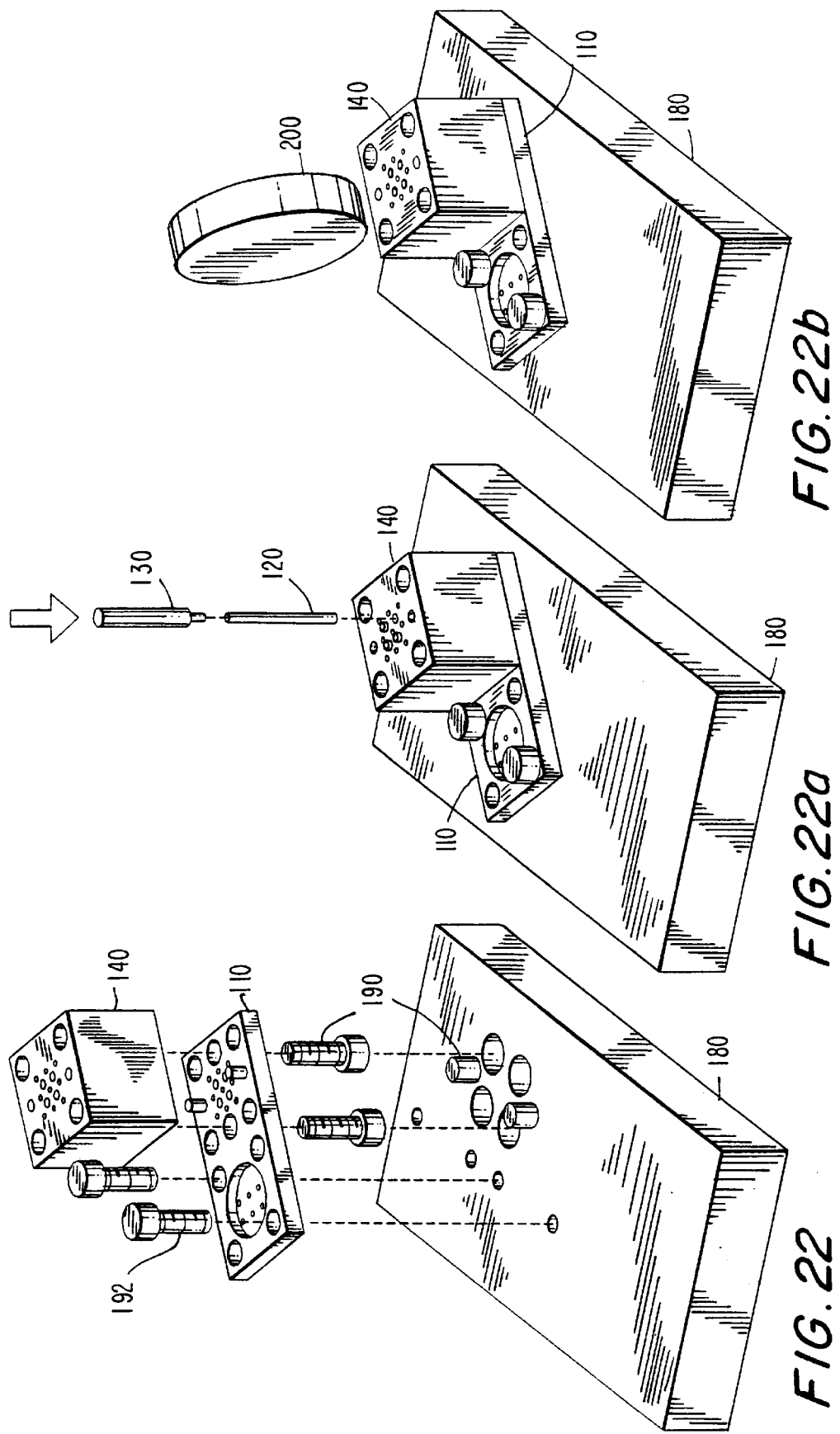

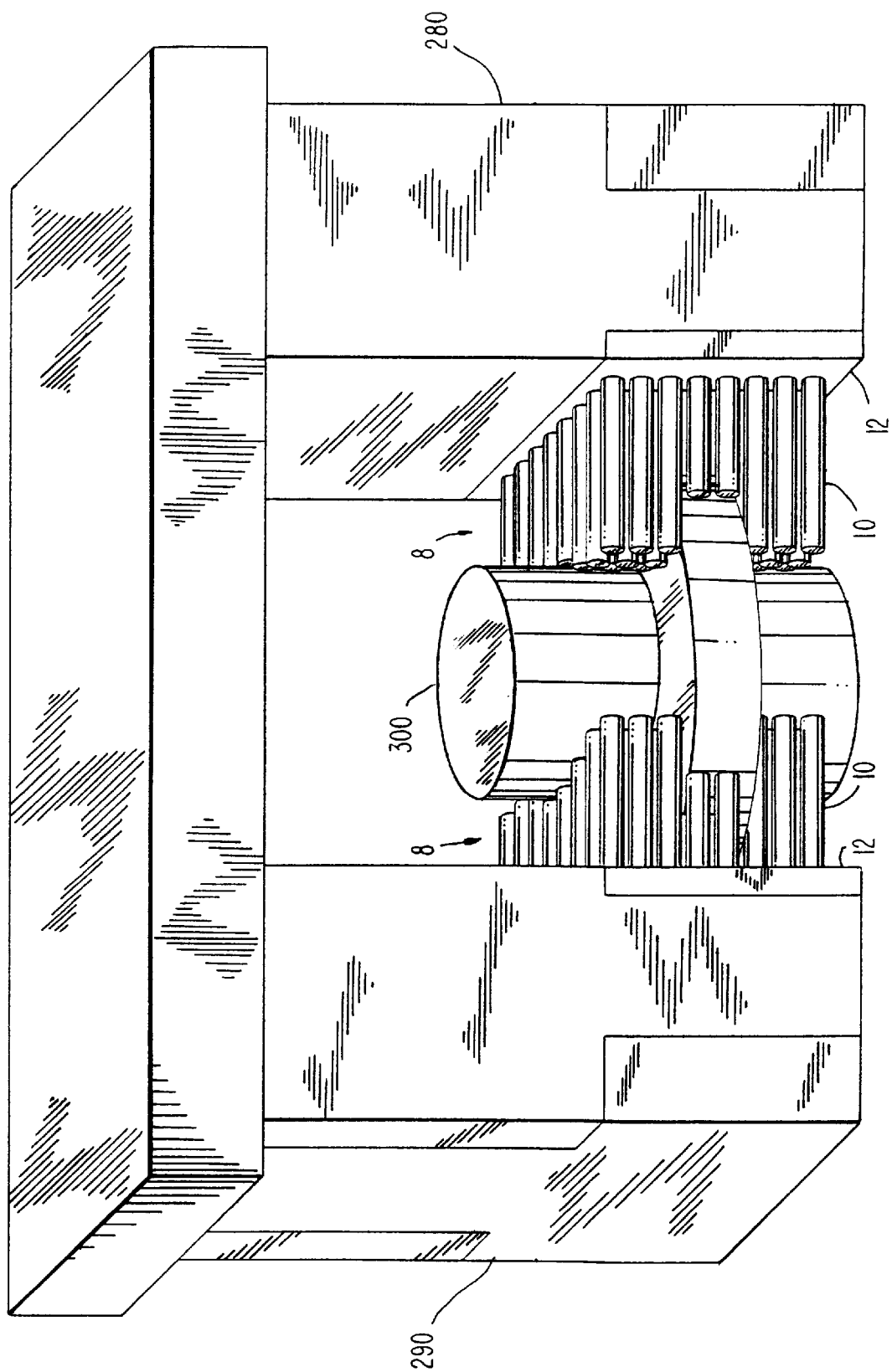

APPARATUS AND METHOD FOR FLEXIBLE GRIPPING OF OBJECTS

This is a continuation of application Ser. No. 08/509,239 filed Jul. 31, 1995, now U.S. Pat. No. 5,608,206.

BACKGROUND OF THE INVENTION

1. Field of the Invention

This invention relates to the field of robotic manipulation of objects and, more particularly, to tactile sensors for flexible gripping of such objects.

2. Description of the Related Art

In order for modern industrial robots to truly interact with their environment, they must be able to grasp and manipulate a wide range of objects even when the objects are presented in random fashion. This necessitates the development of powerful sensing and gripping devices. By and large, available industrial robots can only grasp and manipulate a limited range of objects presented in a precise fashion. One important category of sensing is tactile sensing at the gripping device fingers.

Researchers focusing on the design and performance of tactile sensing devices have suggested that such devices should contain distributed arrays of rugged wear-resistant tactile transducers (tactels) mounted to flexible substrates. The building consensus for desirable properties of these tactile sensors suggests that a tactile array should include an active area of 50–200 sensing elements in a 5×10 to 10×20 array with a separation of tactels in the 1–2 millimeter range to discriminate typical shapes. Detection of a minimum force of 1–5 grams with an upper limit of approximately 1000 grams is also considered appropriate for most light assembly applications. It is suggester that the time for an entire set of sensor data to be collected should be approximately 10 milliseconds (ms) and that the entire sensor data should be updated at a rate of 100 times per second. The sensor's output should be stable over time and it should operate reliably over a wide temperature range in diverse chemical, mechanical, and electrical environments or, in other words, be robust.

Various tactile array sensors, either for commercial use or developed only for research, employ diverse transduction technologies. Indeed, for the most part these sensors have only been developed in experimental form.

Transduction technology, as it applies to tactile sensors, involves the conversion of properties measured through the contact between the sensor and the object into signals to form a tactile image of objects and space. The common transduction technologies include piezoresistive, piezoelectric, capacitive, magnetic, optical, and mechanical.

Piezoresistive transduction typically relies on the changes in electrical conductivity of silicon or carbon-based material as it is stressed by force, temperature, or pressure to produce an image of the object contacted. In general, the sensors developed using this transduction technology exhibit high resolution and sensitivity, linearity, fast response, a wide range of allowable values for the variable to be measured (dynamic range), reasonable cost, and considerable durability. They are heat resistant, easy to fabricate into matrix arrays, and allow for greater conformability to irregular surfaces. If fabricated as matrix arrays, they can be conveniently scanned with row/column addressing methods and the number of wires for an N row×M column sensor may be reduced to N+M wires. However, sensors using conductive elastomers suffer from the problems of electrical noise and creep, and their sensitivity, linearity, response, and dynamic range are inferior to those using carbon fibers.

Piezoelectric sensors utilize polymers which generate an electrical charge in response to an applied force or pressure. These polymers also typically exhibit a pyroelectric effect which is the generation of a voltage when a tactel is heated or cooled. Such sensors are small, low cost, conform to irregular surfaces, have high durability, and good resolution and sensitivity. However, under constant load or constant temperature, the sensor output decays to zero. Moreover, since both pressure and temperature changes produce electric charge, it becomes difficult to distinguish between piezoelectric and pyroelectric effects.

Capacitive transduction utilizes a change in the capacitance of parallel plate capacitors due to the application of a pressure or force causing the distance between the plates to change or the dielectric separating the plates to move. Capacitive sensors with an elastic dielectric layer have been considered favorably since the elastic layer has good mechanical properties with high sensitivity to changing pressures. However, capacitive sensors are susceptible to influence by external fields and require specific materials.

Sensors relying on magnetic transduction technology measure contact surface properties by either movement producing a change in magnetic flux or magnetoelastic materials which show a change in magnetic field when stressed. Magnetic sensors are relatively rare although they have a wide dynamic range, linear and fast response, detect shear and torque, and are fairly robust. However, they are susceptible to stray magnetic fields and can only be composed of a limited group of materials.

Optical sensors convert force or pressure into optical signals through the bending of diaphragms or waveguides and allow designs which are invulnerable to electromagnetic interference. Furthermore, the development of optical fiber technology for transmission and solid-state cameras for intensity imaging has led to new tactile sensor designs which are compact, form high spatial resolution images, eliminate electrical interference, and allow separation of the sensor from processing electronics.

Mechanical sensors typically rely on a matrix of sliding probes or pins to contact the object in interest. They are deemed superior to the majority of sensors reviewed thus far in that they can greatly conform to the shape of an object and evenly grasp and support it. In addition, mechanical sensors are simple to construct and are considered robust for harsh environments. However, they experience probe jamming as the object and sensor contact each other and are bulky and achieve lower spatial resolutions due to the presence of mechanical components in the sensor.

The majority of sensors, except mechancial sensors, possess a protective elastomer cover that contacts the object, but does not conform well to many complex shaped surfaces and, thus, such elastomer cover sensors do not securely grasp objects with such complex shaped surfaces. Moreover, the cover must be made thin to reduce the cross-sensitivity that exists between adjacent tactels in the cover.

The thinness of the cover limits the depth of the space sensed (sampling space) while in contact with the object of interest. This requires a high spatial density of tactels and high sensitivity to cover displacement of tactels to generate accurate shape information from the limited volume of the sampling space. Since analog tactels are easily fabricated into dense arrays with high sensitivity to the displacements required to be measured, they are commonly used in elastomer covered sensors. However, the use of analog tactels requires additional electronic components to convert signals from analog to digital output appropriate for storage and processing by a computer. The analog to digital conversion also reduces the frequency of signal transmission of the tactile array and may present a problem for some real-time sensing applications.

It is, thus, an object of the present invention to provide a gripper/sensor system that is simple to fabricate, operate, grasps securely a wide variety of objects, acquires shape information about each object grasped for manipulation purposes, and has commercial value.

The present invention has been disclosed in "Designing a Highly Conformable Tactile Sensor for Flexible Gripping Using a Digital Probe Array", by Glenn M. Friedman (D.Eng. Thesis), Rensselaer Polytechnic Institute, Troy, New York, August, 1994 (hereinafter referred to as "the Friedman Thesis") and this disclosure is largely taken from it. The actual date of submission of the Friedman Thesis for publication was Aug. 15, 1994. References on the related art may be found on pages 118–128 of the Friedman Thesis. In addition, a partial disclosure of some aspects disclosed herein may be found in Flexible Assembly Systems-1992, The 1992 ASME Design Technical Conferences—4th Conference on Flexible Assembly Systems, Scottsdale, Arizona, Sep. 13–16, 1992, edited by A. H. Soni, University of Cincinnatti, The American Society of Mechanical Engineers, 1992, pages 111 to 117.

SUMMARY OF THE INVENTION

A tactile sensor comprising a two-dimensional array (8 rows by 8 columns) of pneumatically actuated probe subassemblies which fits within a standard parallel gripper attached to a robot securely grasps a wide range of objects with complex surfaces. While grasping the object, the sensor converts the displacement of the probe subassemblies into digital signals through optomechanically encoded sensing sites. The probe subassemblies are initially retracted and their pneumatic actuation eliminates probe jamming which is common in other mechanical sensors. The use of pneumatic actuation also allows automatic control of the total gripping force of the sensor which can be made to vary between 2 and 30 pounds, appropriate for light and rugged applications. The optomechanical encoding of probe subassembly displacements allows a significant reduction of size over that found in other mechanical sensors.

The use of long probes in the sensor with a maximum travel of 0.4 inches allows the sampling space to be increased over sensors with elastomeric covers. Probes also eliminate all cross-sensitivity that might otherwise exist between adjacent tactels and distort the tactile image. Use of the probes allows the sensor to provide absolute measurements of the contact surface and, thus, permits an absolute three-dimensional image of the contact surface after grasp has been achieved.

The elimination of analog tactels in favor of direct digital data from the probe subassemblies allows the elimination of electronic components for analog to digital conversion from the sensor, thereby decreasing the sensor size and increasing the frequency of transmission of data from the sensor.

If two sensors are integrated into the right and left fingers of a robotic parallel gripper, a greatly detailed composite consisting of two tactile images plus the spatial relationship between them (by determining finger displacement) is constructed.

BRIEF DESCRIPTION OF THE DRAWINGS

FIG. 3 is a partial cross-sectional side view of a probe subassembly.

FIG. 3a is a top view of a probe subassembly.

FIG. 7 is a table showing the encoded 4-bit signal representing the output for the encoder tube shown in FIG. 6.

FIG. 10 is a table showing the encoded 4-bit signal representing the output for the encoder tube shown in FIG. 9.

FIG. 11 is a schematic for the communications hardware circuit for the sensor.

FIG. 22 is an exploded perspective view showing the temporary attachment of the plate and the guide block to the special assembly fixture.

FIG. 22a is a perspective view showing the operation of pressing an inner guide tube into the guide block and the plate.

FIG. 22b is a perspective view showing the operation of grinding the flared ends of the inner guide tubes after the pressing operation.

FIG. 31 is a cross-sectional view showing two sensors integrated into the right and left fingers of a robotic parallel gripper gripping an object.

Any dimensions appearing on the drawings are in inches.

DESCRIPTION OF THE PREFERRED EMBODIMENTS

Figure 1A:
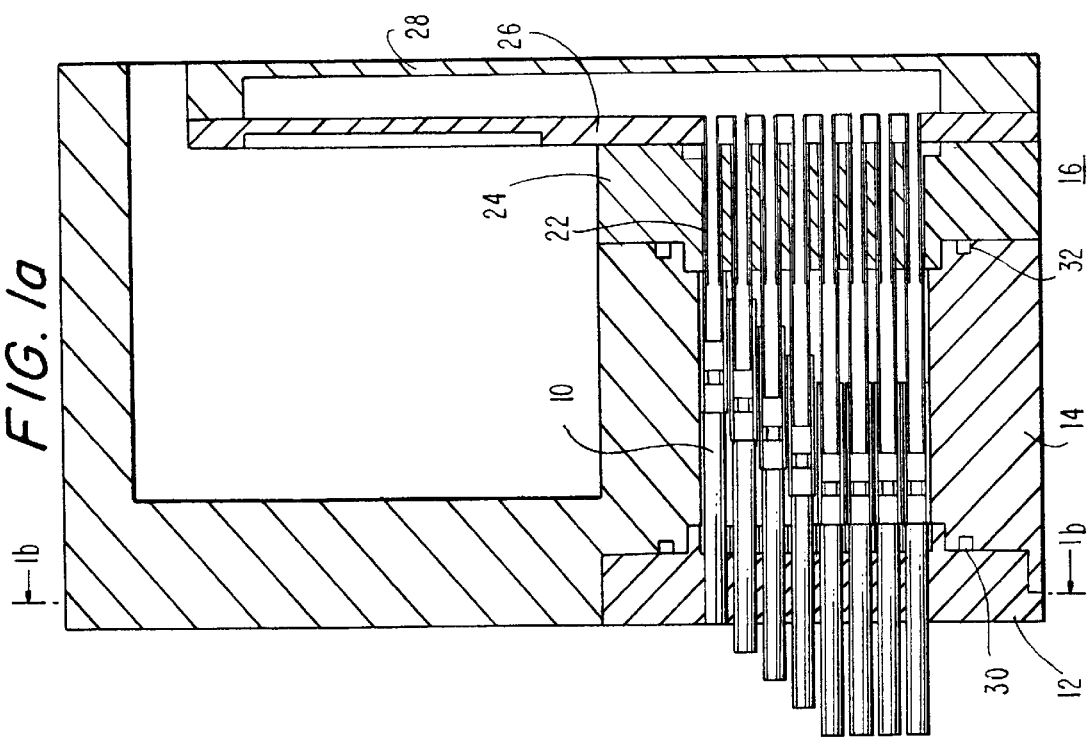
FIG. 1a is a cross-sectional elevation of the sensor.
Figure 1B:
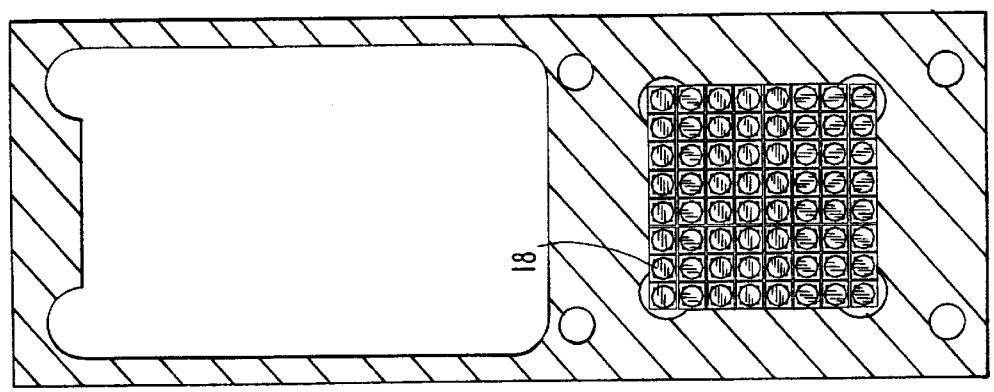
FIG. 1b is a cross-sectional plan of the sensor.
Figure 1:
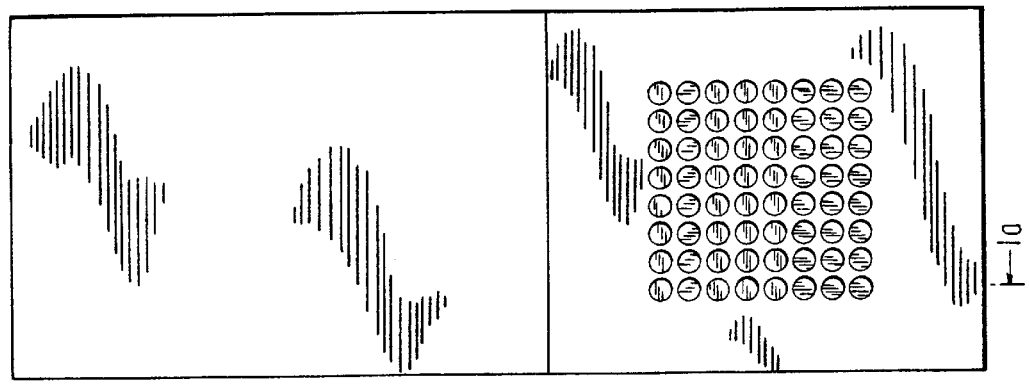
FIG. 1 is a plan view of the sensor.
Figure 2C:
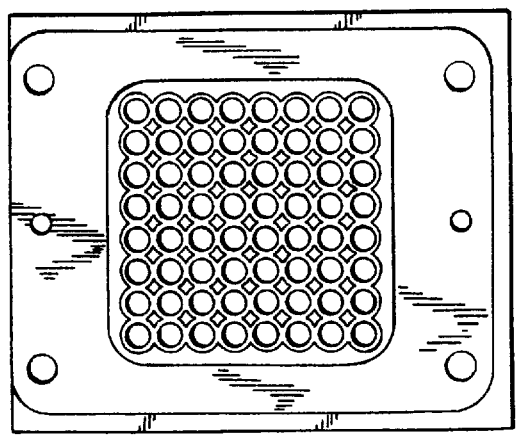
FIG. 2c is a bottom view of the bearing plate.
Figure 2B:
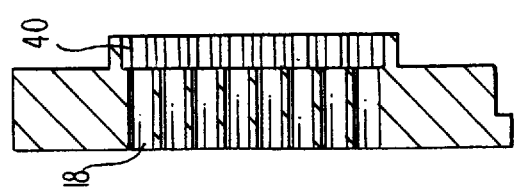
FIG. 2b is a cross-sectional elevation of the bearing plate.
Figure 2A:
FIG. 2a is an elevation view of the bearing plate.
Figure 2:
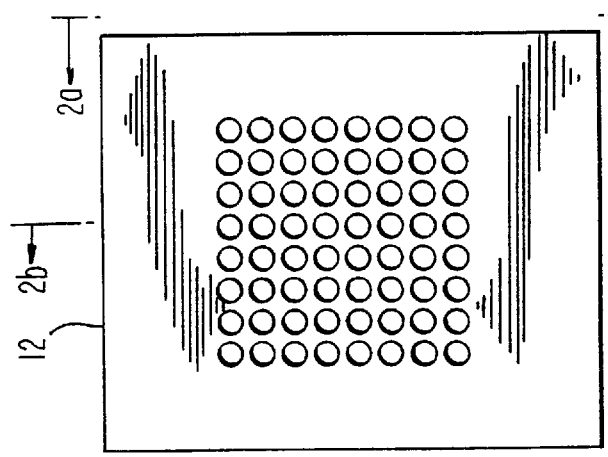
FIG. 2 is a plan view of a bearing plate.

FIGS. 1, 1a, and 1b show a sensor 8 for the flexible gripping of objects. The main hardware components of the sensor 8 include probe subassemblies 10, a bearing plate 12, an aluminum finger housing 14, and a sensor array 16. The probe subassemblies 10 are disposed in an eight row by eight column array to contact and grip the objects of interest. Holes 18 are drilled through the bearing plate 12 corresponding to the array disposition of probe subassemblies 10 and the probe subassemblies 10 pass through the holes 18 in contacting and gripping an object. The finger housing 14 houses both the encoder tubes 20 (FIG. 3), which assist in converting the displacement of the probe subassemblies 10 into digital signals, and the probes 15 (FIG. 3). The sensor array 16 contains inner guide tubes 22 passing through a plate 26, preferably stainless steel, and a guide block 24, preferably aluminum. A bottom cap 28, also preferably aluminum, is mounted to encapsulate the optical fiber bundle running from the inner guide tube 22 array to an emitter/detector array (see FIG. 4, 64 and 66). (The emitter/detector electronic components and cabling are not shown.)

FIGS. 2, 2a, 2b, and 2c show the stainless steel bearing plate 12 and its design in greater detail. The bearing plate 12 has holes 18 which are counterbored 40 to seat compression springs 70 (FIG. 5) initially retracting the probe subassemblies 10. The bearing plate 12 is connected by dowel pins (not shown) to the finger housing 14 so as to precisely align with the inner guide tubes 22 in the sensor array 16 which is mounted and pinned by pins (not shown) at the back side of the finger housing 14.

Figure 3C:
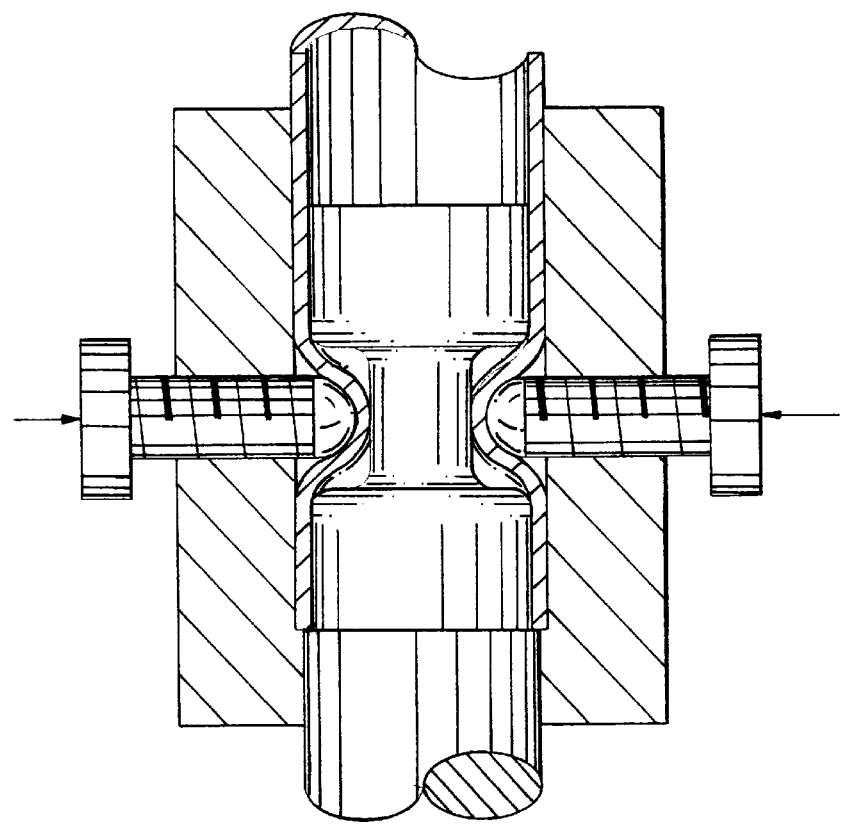
FIG. 3c is a partial cross-sectional view of the grooved stem of the probe and the retainer tube after the crimping operation.
Figure 3B:
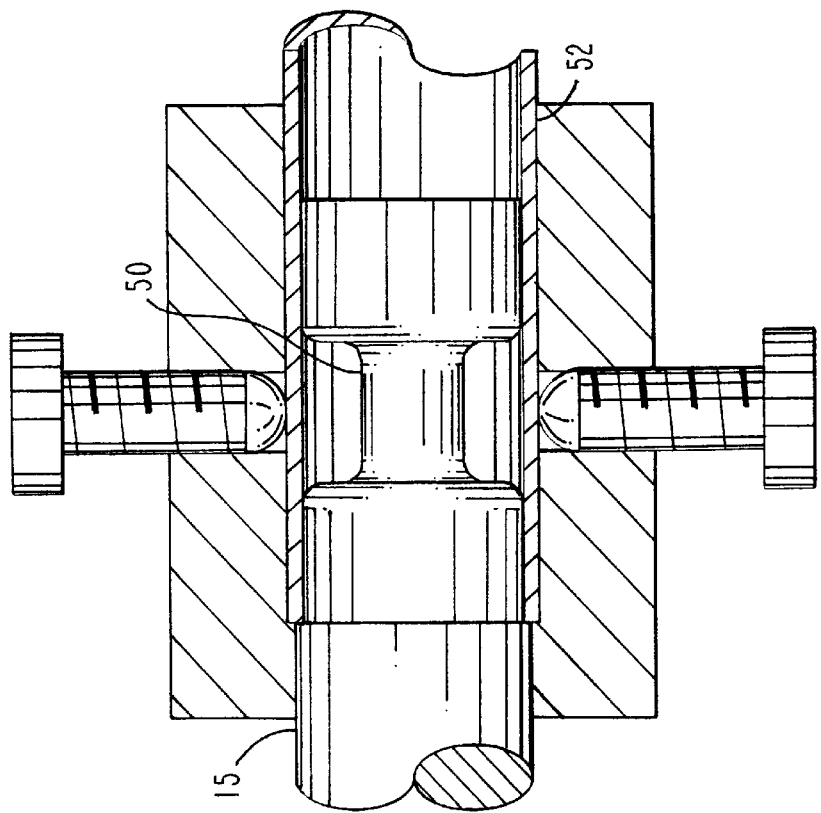
FIG. 3b is a partial cross-sectional view of the grooved stem of the probe and the retainer tube before the crimping operation.
Figure 6:
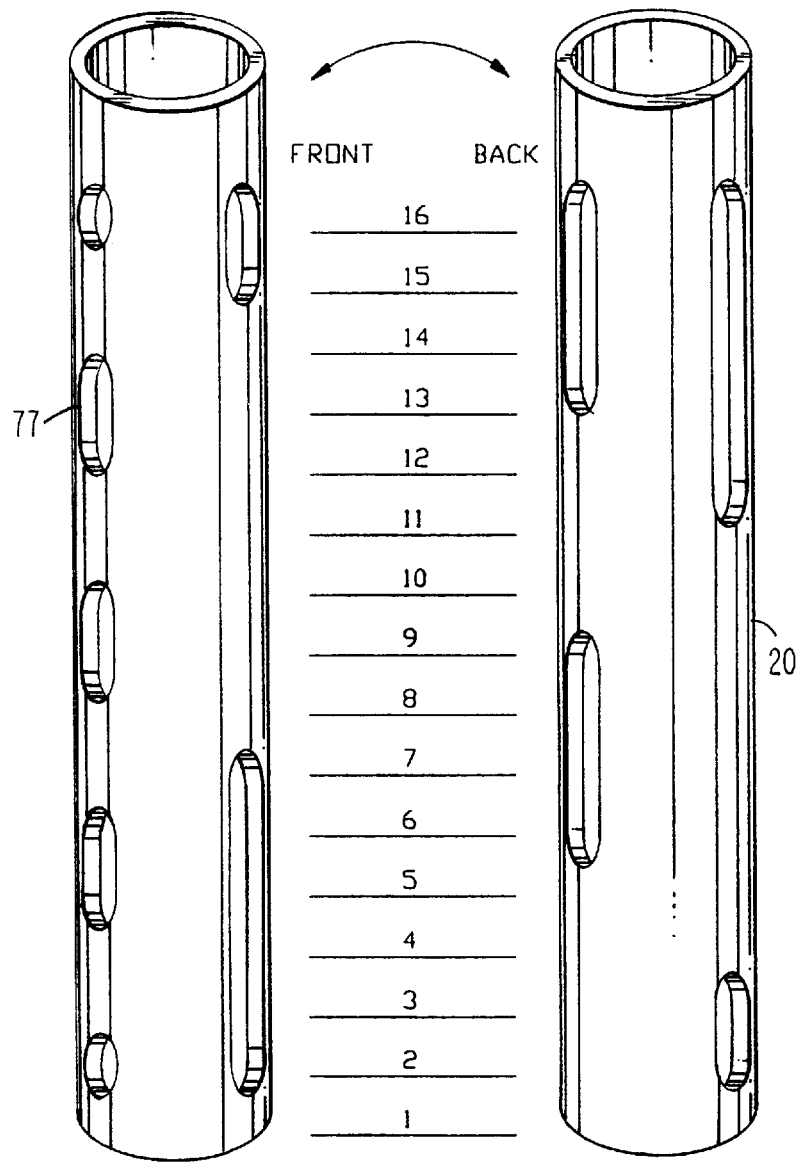
FIG. 6 is an elevation of the front and back of an encoder tube with the preferred pattern of slots and holes cut into it.

FIGS. 3 and 3a show the design of a preferred individual probe subassembly 10. In the probe subassembly 10, there is a probe 15 which is a highly polished, precision ground, heat treated alloy steel pin. A grooved stem 50 is produced at the bottom of the probe 15 by a grinding operation at high rotation speeds and a crimping process shown in FIGS. 3b and 3c assures a tight-fitted attachment between the probe 15 and a square retainer tube 52. The square retainer tube 52 limits the extension of the probe subassembly 10 by contacting the bearing plate 12 and restricts the probe subassembly 10 to pure axial sliding motion (without rotation) due to the interference of adjacent square retainer tubes 52. This prevention of rotation by the probe subassembly 10 assures that the columns of patterned slots and holes 77 (FIG. 6), in the encoder tube 20, which is precisely fastened by pinning to the retainer tube 52, remain aligned to the fiber optic signals passing through the patterned slots and holes 77 (FIG. 6).

Figure 5:
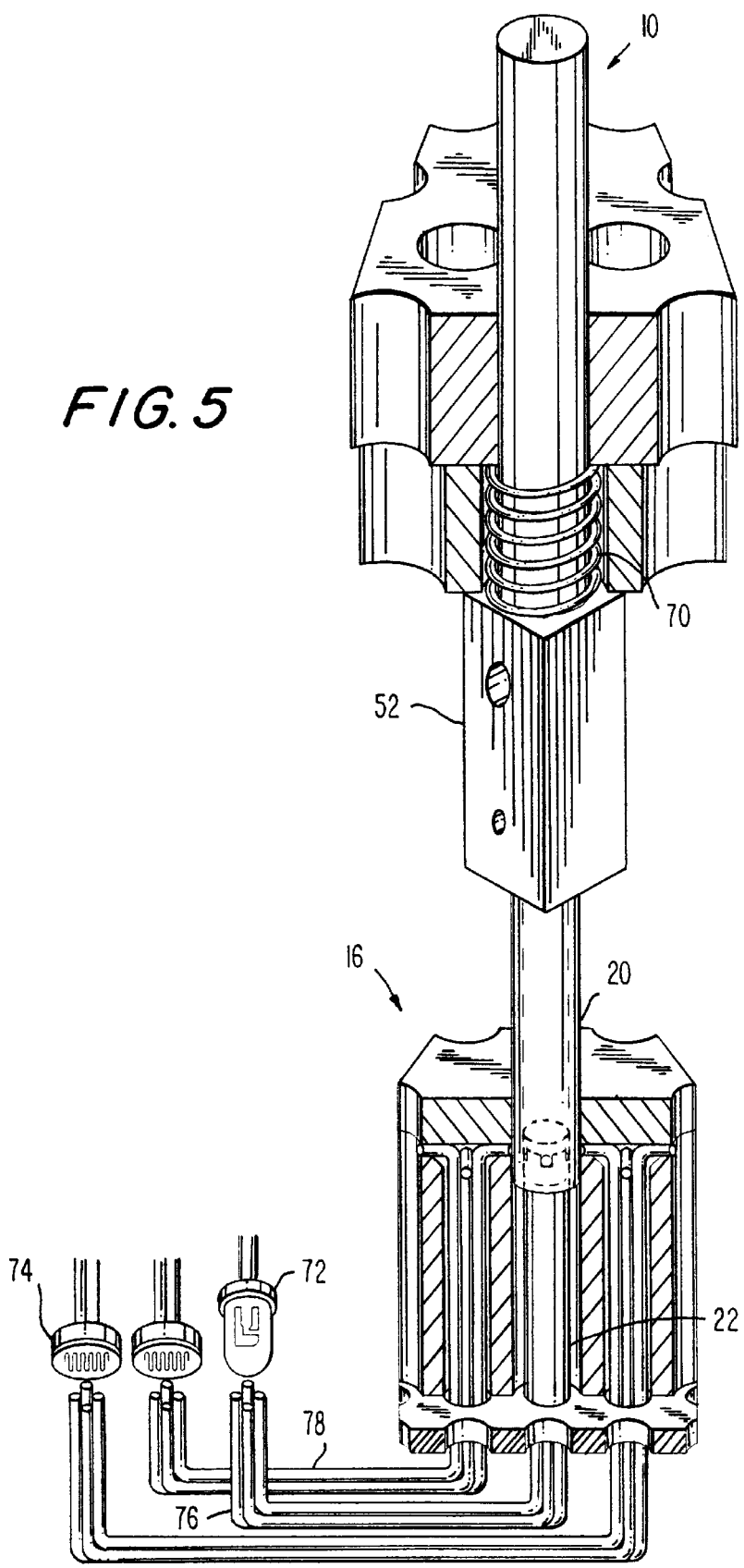
FIG. 5 is an elevation of a probe subassembly located in situ with a cross-section of a portion of the bearing plate and a cross-section of a portion of the sensor array along with the optical and optoelectronic components located in the sensor array.

As previously mentioned, the probe subassemblies 10 are initially retracted by compression springs 70 (FIG. 5). After contact between the bearing plate 12 and the object to be gripped is made, the probe subassemblies 10 are then extended pneumatically by a maximum distance of 0.4 inches by any convenient means such as by using compressed shop air. Such operation of the probe subassemblies 10 prevents probe jamming during contact with steep surfaces on the object and produces a variable gripping force ranging from approximately 2 to 30 pounds allowing the handling of both delicate and rugged parts. The two pound force permits the desired upper design goal of 1,000 grams for light assembly applications to be achieved.

In order to allow the sensor 8 to operate pneumatically, an air fitting (not shown) is attached and manifold holes (not shown) have been included in the finger housing 14. O-rings (not shown) have been used to seal the bearing plate 12 to the finger housing 14 and the sensor array 16 to the finger housing 14. There are O-ring grooves 30 (FIG. 1a) for the O-rings used to seal the bearing plate 12 to the finger housing 14 and O-ring grooves 32 (FIG. 1a) for the O-rings used to seal the sensor array 16 to the finger housing 14. Precision machining of the bearing plate holes 18 assures a sufficient clearance between these holes 18 and the probes 15 to provide a sliding fit, yet eliminate the need for seals for the probes 15 inside the bearing plate holes 18.

Figure 4B:
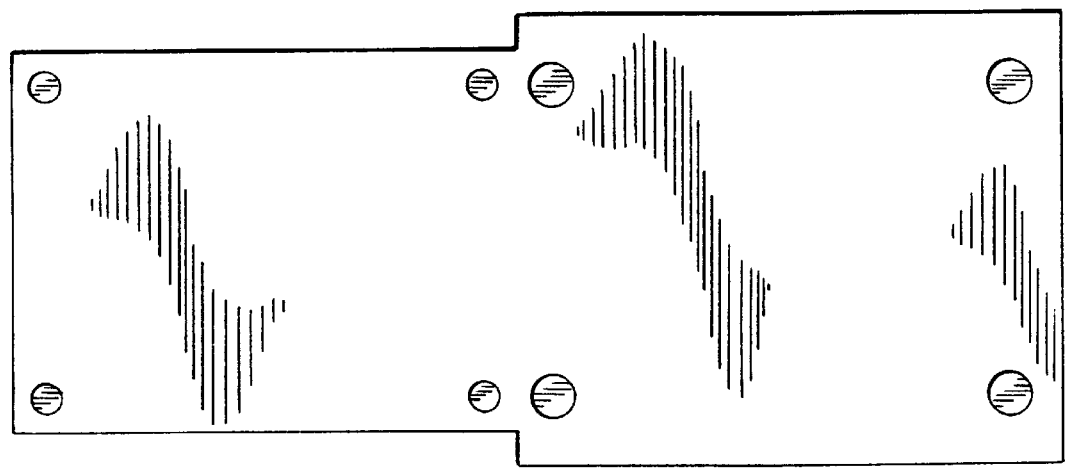
FIG. 4b is a bottom view of the sensor array.
Figure 4A:
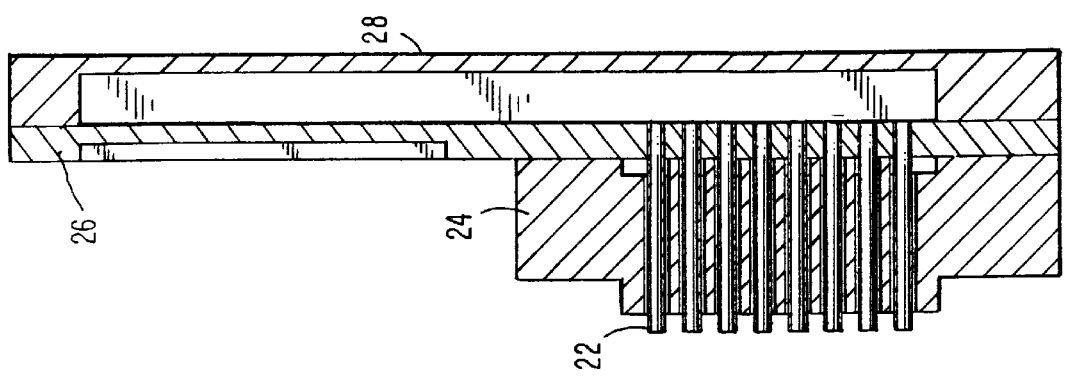
FIG. 4a is a cross-sectional elevation of the sensor array.
Figure 4:
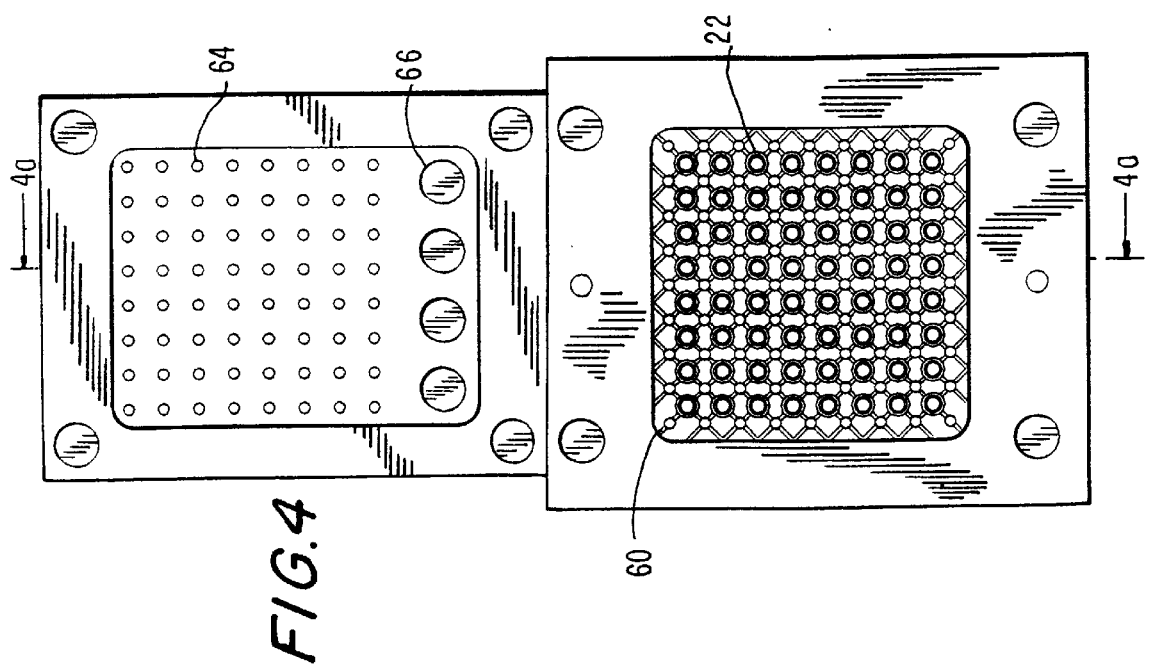
FIG. 4 is a plan view of a sensor array.

FIGS. 4, 4a and 4b show the design of the sensor array 16 in greater detail. Fiber holes 60 are provided to position the receive fibers 78 (FIG. 5) relative to the encoder tubes 20. The fiber holes 60 pass through both the stainless steel plate 26 and the aluminum guide block 24. Four (4) or less receive fibers 78 are contained in each fiber hole 60 depending on the location of the fiber hole 60. An array of emitter holes 64 is provided in the plate 26 to allow transmit fibers 76 (FIG. 5) passing through the emitter holes 64 to absorb optical signals emitted by emitters 72 (FIG. 5) positioned at each hole 64. Each emitter hole 64 contains four (4) transmit fibers 76. The array of emitter holes 64 is disposed in an eight row by eight column array corresponding to the array of probe subassemblies 10. A row of four (4) detector holes 66 allows four (4) photodetectors 74 (FIG. 5), one photodetector 74 being positioned at each hole 66, to detect optical signals carried by receive fibers 78 passing through those holes 66. Each one of the four (4) or less receive fibers 78 contained in each fiber hole 60 passes through the same one of the four (4) detector holes 66 (see FIG. 11).

FIG. 5 shows a probe subassembly 10 mounted on the sensor array 16 which is shown in a partial sectional view. One emitter 72 corresponding to each probe subassembly 10 emits light through four (4) transmit fibers 76. Depending on the position of the probe subassembly 10 and the consequent position of the encoder tube 20 and the columns of patterned slots and holes 77 (FIG. 6) in the encoder tube 20, light is selectively transmitted to or blocked from being transmitted to the four (4) receive fibers 78 contained in the fiber holes 60 (FIG. 4) diagonally situated around the four (4) transmit fibers 76 and ultimately to the four (4) photodetectors 74. The encoding of probe subassembly 10 positions using the columns of patterned slots and holes 77 (FIG. 6) in the encoder tube 20 and the selective transmission of light from the transmit fibers 76 to the receive fibers 78 can be conveniently referred to as optomechanical encoding of such probe subassembly 10 positions. The inner guide tubes 22 are disposed between the transmit fibers 76 and the inner radii of the encoder tubes 20. Each inner guide tube 22 contains four (4) transmit fibers 76.

Figure 8:
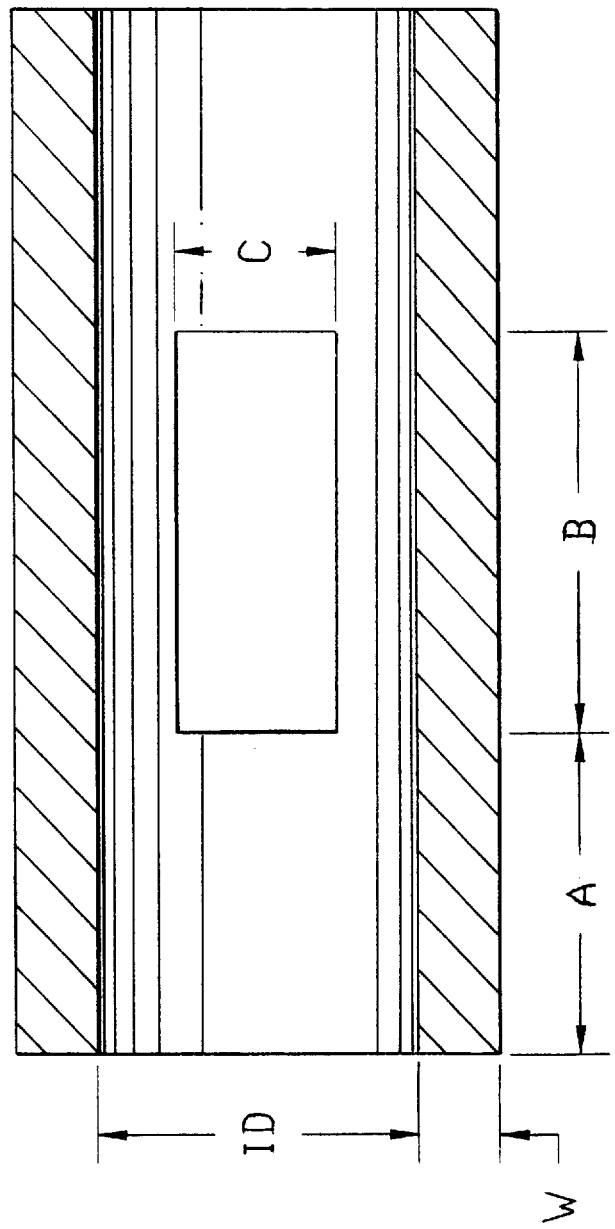
FIG. 8 is a schematic cross-section of an encoder tube showing typical design limitations for punching.

FIG. 6 shows a preferred pattern for the four (4) columns of slots and holes 77 in the encoder tube 20 and FIG. 7 is a table showing in numerical form the sixteen (16) possible 4-bit signals representing output of the encoder tube 20 corresponding to FIG. 6. The pattern in FIG. 6 is directed toward a common problem that arises at the transition points (edges of the holes, and slots) of the pattern arrangement. This problem is the occurrence of erroneous signals due to slight errors in the positions of the holes or optical fibers. Thus, it is quite possible that one column will switch a bit on or off an instant before another column at any given transition point resulting in a mistaken interpretation of signals. The pattern shown in FIG. 6 remedies this problem by using a "gray code" pattern based on the principle that only one bit is permitted to change at any given transition point. The slotting of the encoder tubes 20, which can be supplied in a variety of alloys (aluminum, copper, nickel, ferrous, reactive, and precious), is produced by a secondary punching that creates multiple square slots at 90° offset locations. Typical design limitations for punching are illustrated schematically on a cross-section of the encoder tube 20 shown in FIG. 8 where the minimum value of A is approximately 2×W with a tolerance of ±0.003 inches (in), the minimum value of B is approximately 2×W with a tolerance of ±0.001 in where W has a minimum value of 0.010 in, the maximum value of C is approximately ID−(4× W), the minimum value of C is approximately 2×W with a tolerance of ±0.001 in where W has a minimum value of 0.010 in, and the hole produced is free of burrs greater than 0.001 inches in dimension.

Figure 9:
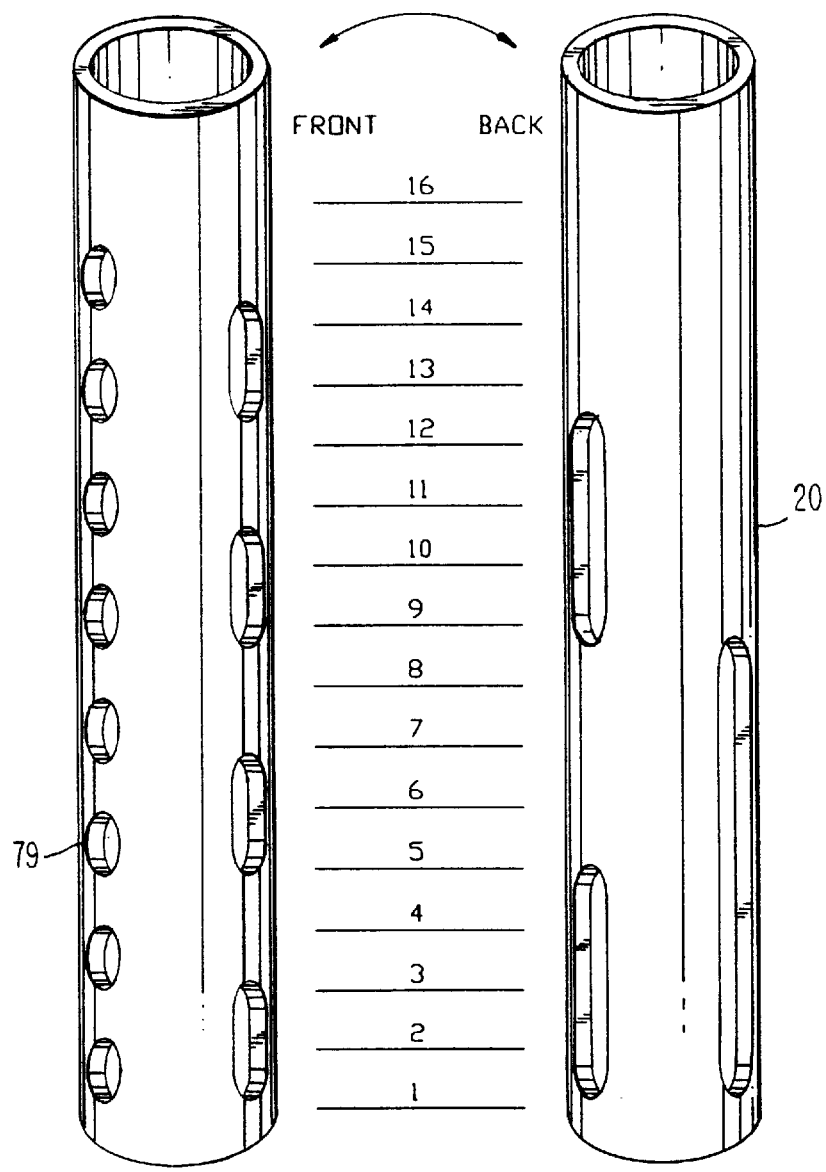
FIG. 9 is an elevation of the front and back of an encoder tube with an alternative pattern of slots and holes cut into it.

FIG. 9 shows an alternative pattern for the four (4) columns of slots and holes 79 in the encoder tube 20 and FIG. 10 is a table showing in numerical form the sixteen (16) possible 4-bit signals representing the output of the encoder tube 20 corresponding to FIG. 9.

FIG. 11 shows a schematic for a communications hardware circuit 80 for the sensor 8. A computer gathering the data from the sensor 8 outputs two 3-bit digital addresses, one to energize one of eight columns of emitters 72 and the other to ground one of eight rows of emitters 72. The addresses are received through optocouplers 82 and decoded by decoders 84 to activate one of the sixty-four (64) emitters 72 illuminating its four (4) transmit fibers 76 (FIG. 5). Light radiating out the ends of the four (4) transmit fibers 76 passes through the encoded holes of the encoder tube 20 (if they are present) to the four (4) receive fibers 78 (FIG. 5) contained in the adjacent diagonally located four (4) of the total of eighty-one (81) fiber holes 60 (FIG. 4). These four (4) receive fibers 78 in turn activate the four (4) photodetectors 74 (FIG. 5), each one of the four (4) receive fibers 78 activating a different one of the four (4) photodetectors 74 from the three (3) photodetectors 74 activated by the other three (3) of the four (4) receive fibers 78. From the four (4) photodetectors 74, a 4-bit digital word is transmitted through optocouplers 86 to the computer for storage and future reconstruction of the data. The image transmission rate required to scan all sixty-four (64) probe subassemblies 10 is on the order of 1.1 ms, well within the previously mentioned design goal of 10 ms.

Figure 12:
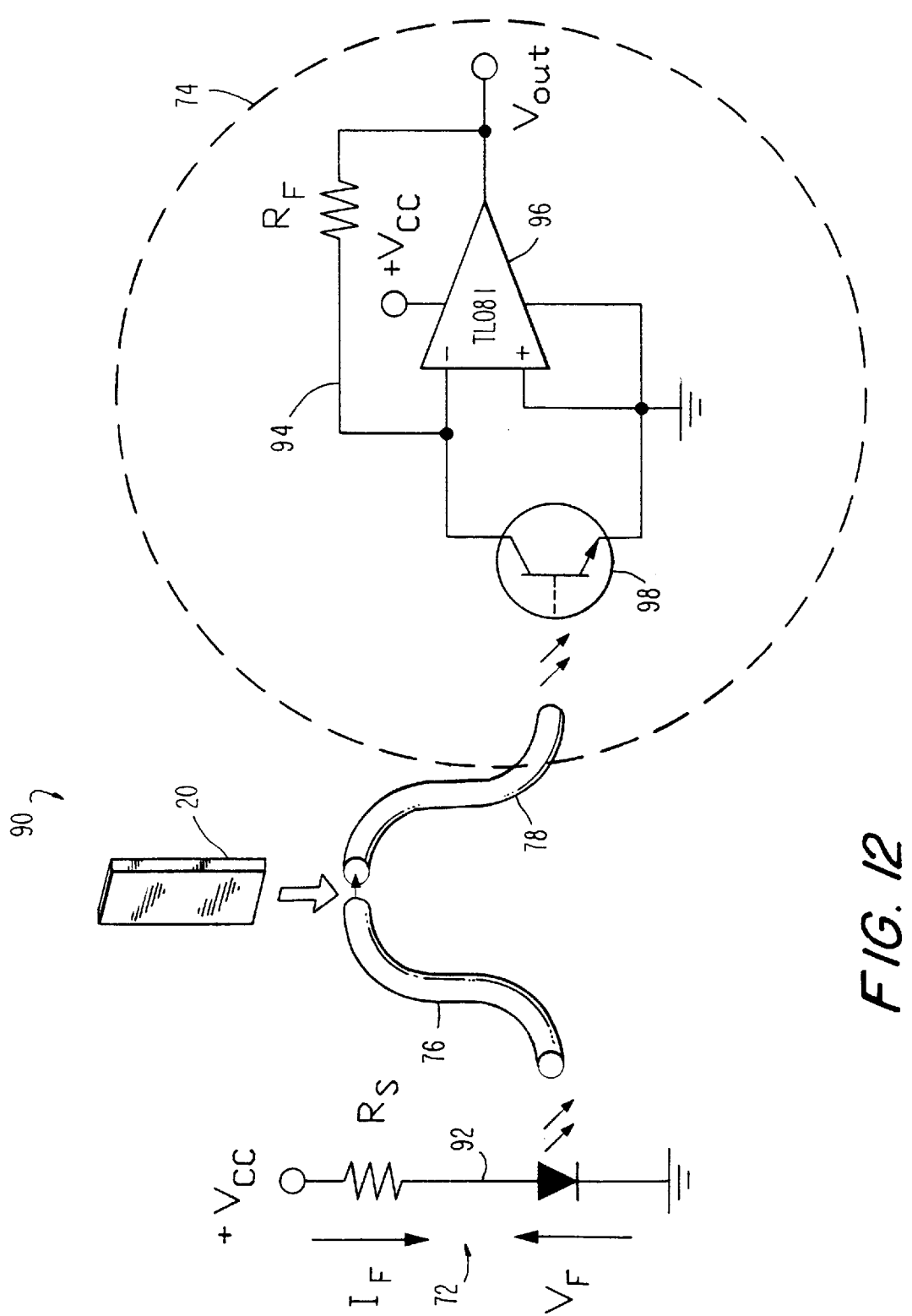
FIG. 12 is a schematic of the photodetection circuit used in the sensor.

FIG. 12 shows a schematic of the photodetection circuit 90 used in the sensor 8. This schematic shows an emitter circuit 92 contained within the emitter 72, the transmit fiber 76, a section of the encoder tube 20, the receive fiber 78, and a detector circuit 94 contained within the photodetector 74.

The transmit fibers 76 and the receive fibers 78 are preferably made from a synthetic plastic such as one having a high purity polymethyl methacrylate core and special fluorinated polymer cladding. The use of these materials in the fibers allows for extremely small bend radii. The diameter of the fibers is 0.250 millimeter. These small diameters and bend radii allow packaging of the fibers around sharp corners and into small volumes.

The light source comprised within the emitter circuit 92 that is preferred for the combination of the fibers and the detector circuit 94 is a Gallium Aluminum Arsenide (GaAlAs) infrared light emitting diode (IRED) emitting at a peak wave length of 880 nanometers (nm).

An operational amplifier 96 of very high gain is necessary in the detector circuit 94 to successfully detect the faint light signal from the receive fiber 78. The feedback resistor $R_F$ in FIG. 12 defines the gain of the operational amplifier 96 and is 2.2 megaohms. The light signal is so faint because of the extremely small diameter of the fibers and because of the use of an IRED with plastic fibers. Plastic fibers are normally only used with visible light sources. The increase in light attenuation by the fiber, when using an IRED instead of a visible red light source for which light transmission by the fiber peaks, is far outweighed by the increase in response to the light in the infrared range by the phototransistor 98 in the detector circuit 94.

It is highly desirable that the two optical fibers per signal, the transmit fiber 76 and the receive fiber 78, be accurately aligned and spaced so as to allow transmission of the faint infrared signal across the gap between the fibers and to allow the travel of the encoder tube 20 in the gap. To assure this result, a special process has been developed for placement of the optical fibers which is illustrated by the process for the construction of a 2 row by 2 column test sensor array 100 (FIG. 13).

Figure 13:
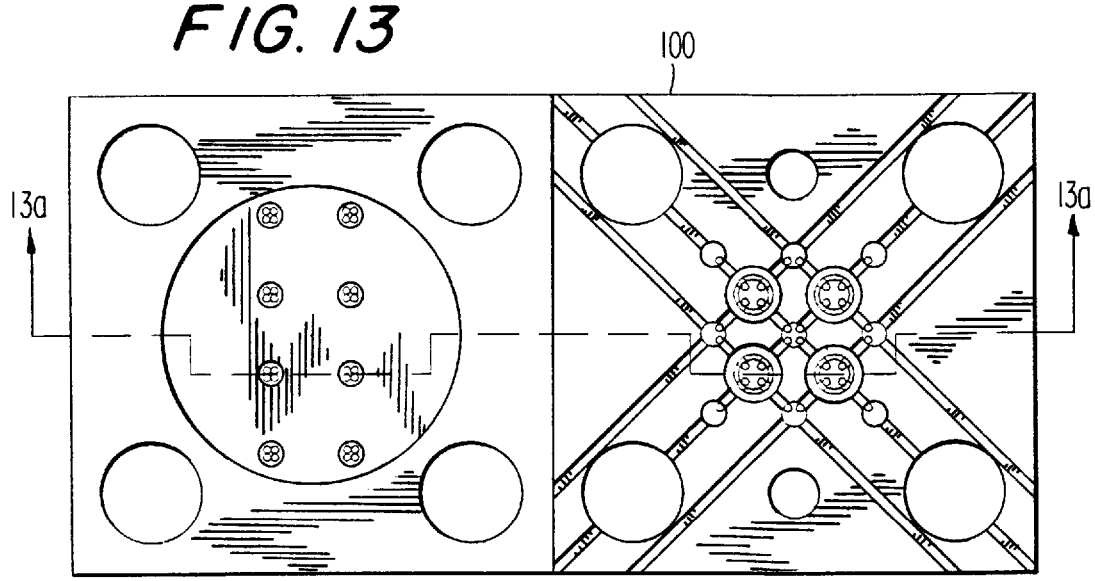
FIG. 13 is a plan view of a test sensor array.
Figure 13A:
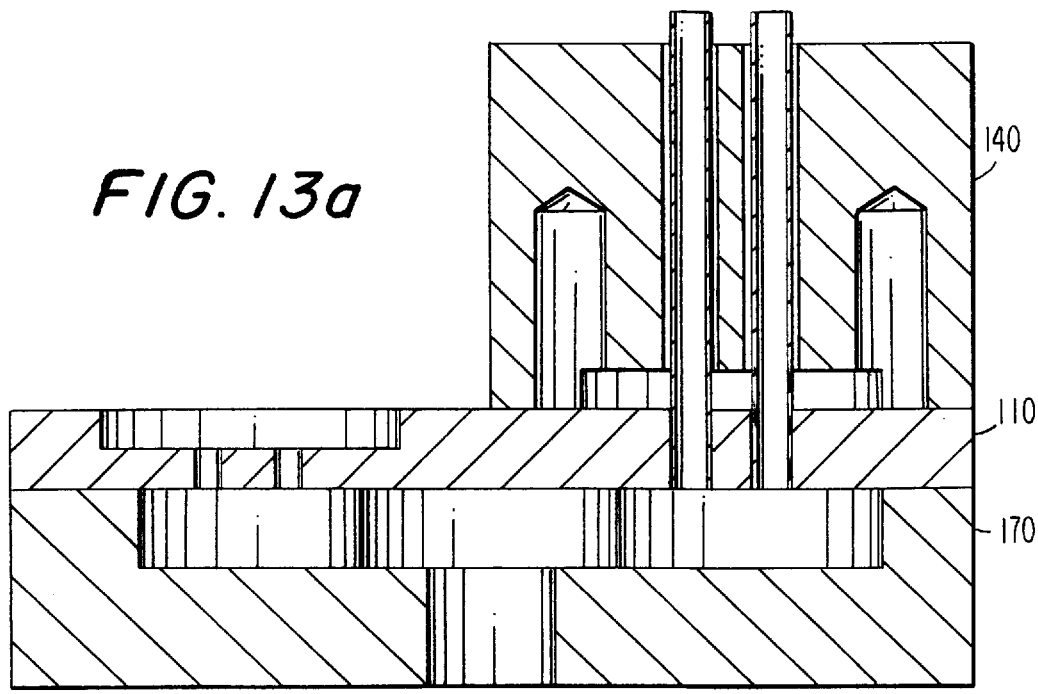
FIG. 13a is a cross-sectional elevation of the test sensor array.

FIG. 13 shows a plan view of the test sensor array 100 and FIG. 13a shows a cross-sectional view of the test sensor array 100. The test sensor array 100 illustrated includes a stainless steel plate 110, an aluminum guide block 140, and an aluminum bottom cap 170.

Figure 14:
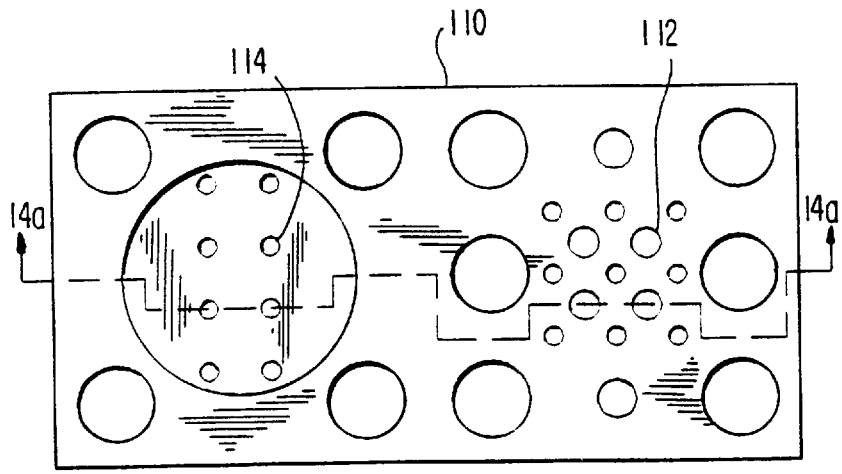
FIG. 14 is a plan view of the plate used in the test sensor array.
Figure 14A:
FIG. 14a is a cross-section of the plate.
Figure 14B:
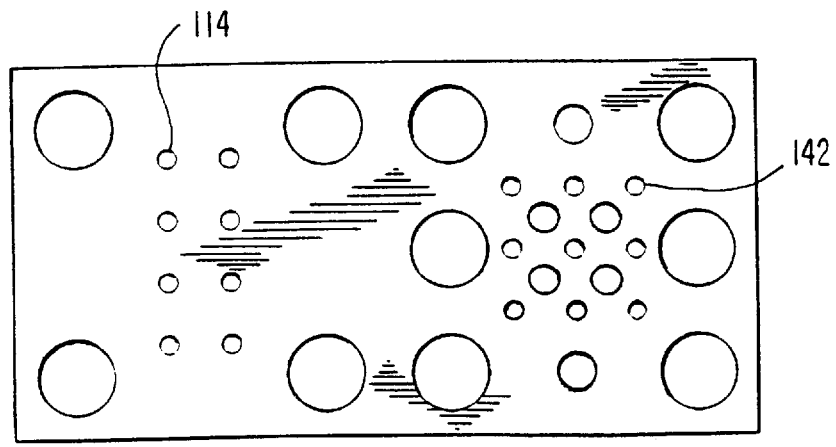
FIG. 14b is a bottom view of the plate.

FIG. 14 shows a plan view of the stainless steel plate 110 with a two row by two column array of holes 112, each hole containing one set of four (4) transmit fibers 76 (FIG. 5) in the test sensor array 100. The plate 110 also has eight holes 114 drilled at the sites for the four (4) emitters 72 (FIG. 5) and four (4) photodetectors 74 (FIG. 5). FIG. 14a shows a cross-sectional view of the plate 110 and FIG. 14b shows a bottom view of the plate 110.

Figure 15:
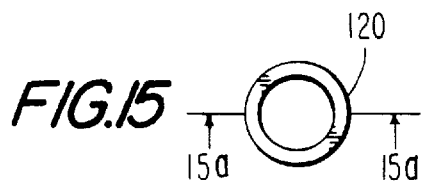
FIG. 15 is an elevation and plan view of an inner guide tube which is pressed into the test sensor array.
Figure 16:
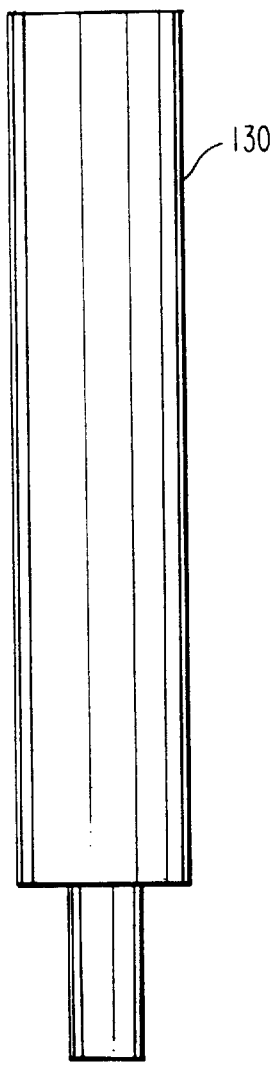
FIG. 16 is an elevation and plan view of the special insertion tool used to press the inner guide tubes into the test sensor array.
Figure 15A:
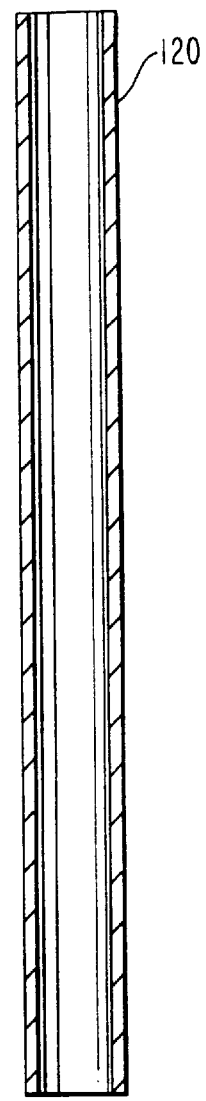
Figure 16A:
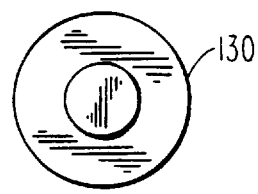

FIG. 15 shows an inner guide tube 120 which is pressed into each transmit fiber 76 (FIG. 5) hole 112 in the test sensor array 100. FIG. 16 shows a special insertion tool 130 used to press the inner guide tube 120 into each transmit fiber 76 (FIG. 5) hole 112 in the test sensor array 100.

Figure 17:
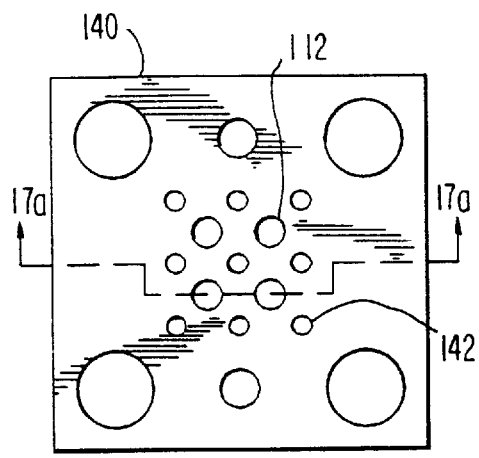
FIG. 17 is a plan view of the guide block used in the test sensor array.
Figure 17A:
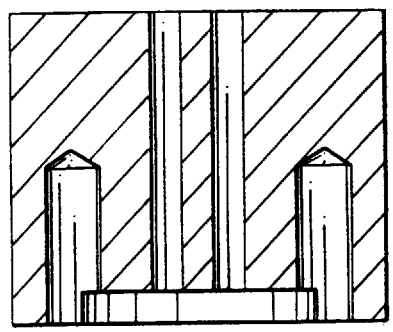
FIG. 17a is a cross-sectional elevation of the guide block.
Figure 17B:
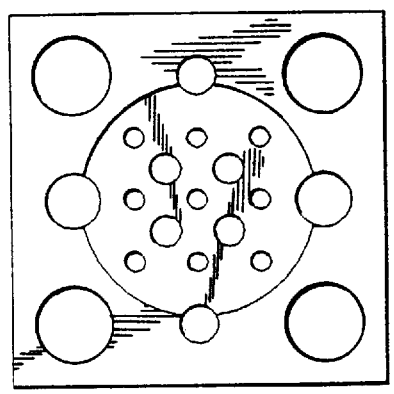
FIG. 17b is a bottom view of the guide block.

FIG. 17 shows a plan view of the aluminum guide block 140, which is pinned and fastened to the plate 110 from above, has a two row by two column array of transmit fiber 76 (FIG. 5) holes 112, and provides alignment and support during the operation of pressing the inner guide tubes 120 into the transmit fiber 76 (FIG. 5) holes 112.

Both the plate 110 and the block 140 have a three row by three column array of fiber holes 142 positioned diagonally about the four (4) holes 112 containing each set of four (4) transmit fibers 76 (FIG. 5) in the test sensor array 100, each fiber hole 142 containing four (4) or less receive fibers 78 (FIG. 5).

Figure 18:
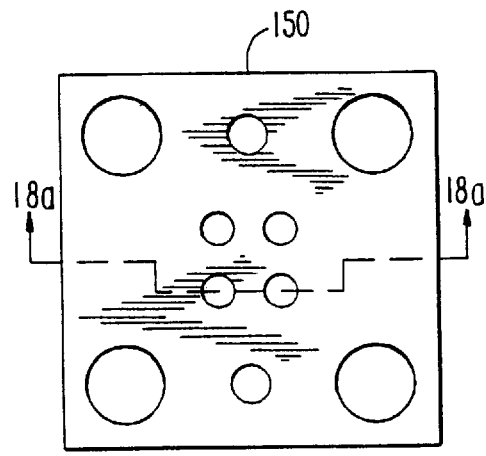
FIG. 18 is a plan view of a top cap placed on the guide block.
Figure 18A:
FIG. 18a is a cross-sectional elevation of the top cap.
Figure 18B:
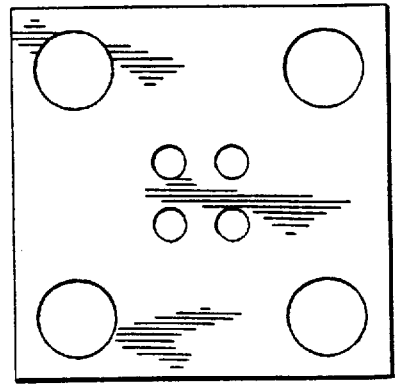
FIG. 18b is a bottom view of the top cap.

FIG. 18 shows a plan view of a top cap 150 pinned to the guide block 140 from above to hold the free ends of the inner guide tubes 120. FIG. 18a shows a cross-sectional view of the top cap 150 and FIG. 18b shows a bottom view of the top cap 150.

Figure 19:
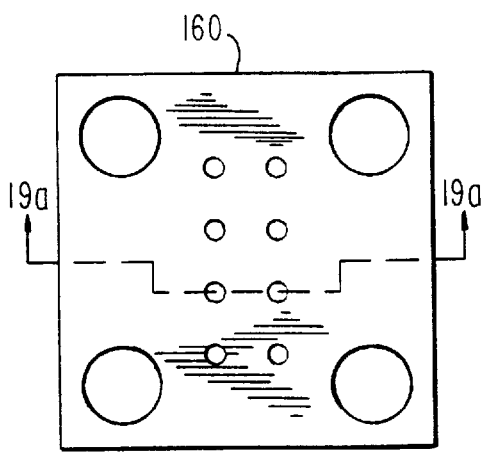
FIG. 19 is a plan view of a top cap placed on the plate.
Figure 19A:
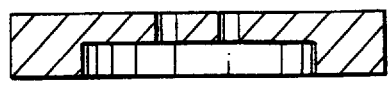
FIG. 19a is a cross-sectional elevation of the top cap.
Figure 19B:
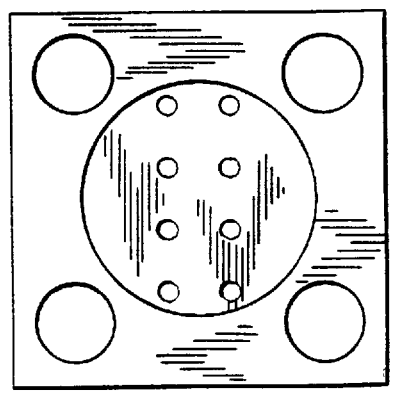
FIG. 19b is a bottom view of the top cap.

FIG. 19 shows a plan view of a top cap 160, attached to the plate 110 from above, to secure the optical fibers. FIG. 19a shows a cross-sectional view of the top cap 160 and FIG. 19b shows a bottom view of the top cap 160.

Figure 20:
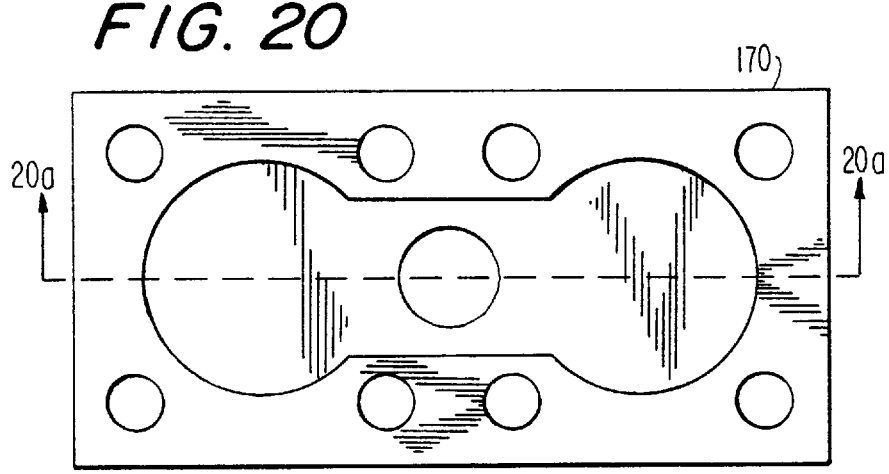
FIG. 20 is a plan view of a bottom cap placed on the plate.
Figure 20A:
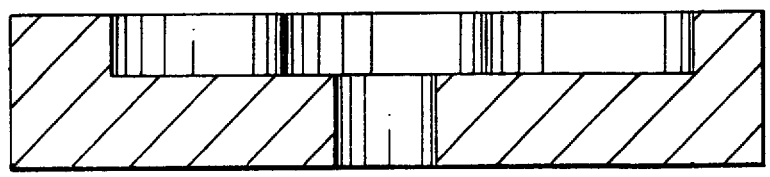
FIG. 20a is a cross-sectional elevation of the bottom cap.
Figure 20B:
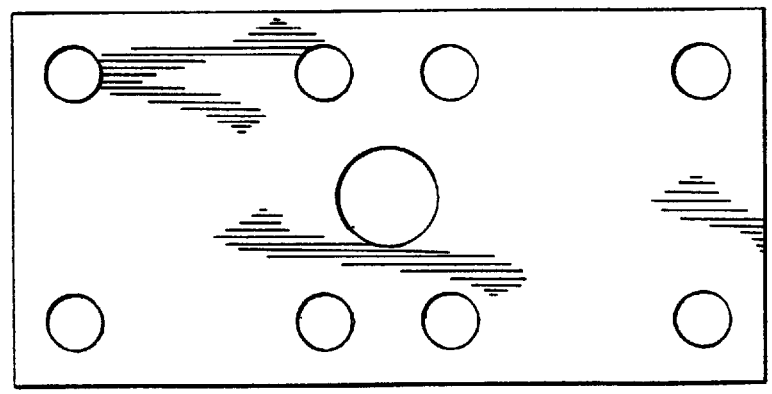
FIG. 20b is a bottom view of the bottom cap.

FIG. 20 shows a plan view of a bottom cap 170, which secures the bundle of optical fibers emerging from the bottom of the plate 110, and provides a port for injecting epoxy. FIG. 20a shows a cross-sectional view of the bottom cap 170, and FIG. 20b shows a bottom view of the bottom cap 170.

Figure 21:
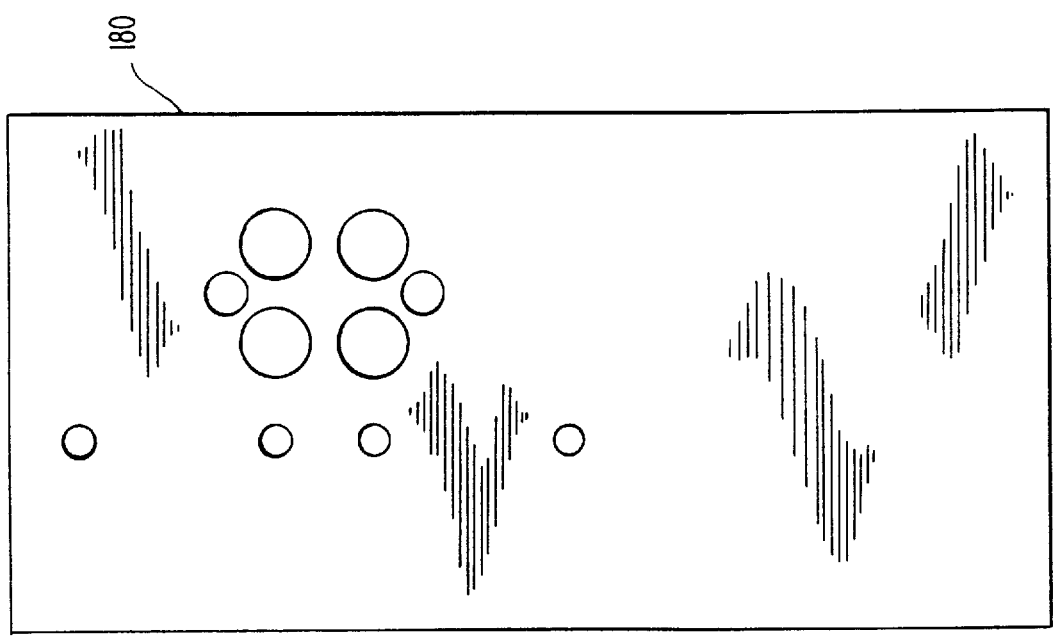
FIG. 21 is a plan view of a special assembly fixture for the test sensor array.

FIG. 21 shows a special assembly fixture 180 used to precisely hold some of the parts of the test sensor 100 during construction.

FIGS. 22 through 30 illustrate a method of assembling and machining used to construct the test sensor array 100.

In FIG. 22, the guide block 140 is pinned and temporarily fastened from below to the plate 110 using fasteners 190. The plate 110 is also fastened from above to the special assembly fixture 180 by fasteners 192. FIG. 22a shows one of the four inner guide tubes 120 being pressed into place by the special insertion tool 130. FIG. 22b shows a grinding device 200 being used to remove flared ends of the inner guide tubes 120 which are 0.020 inches long and which occur as a result of the pressing operation.

Figures 23, 23A:
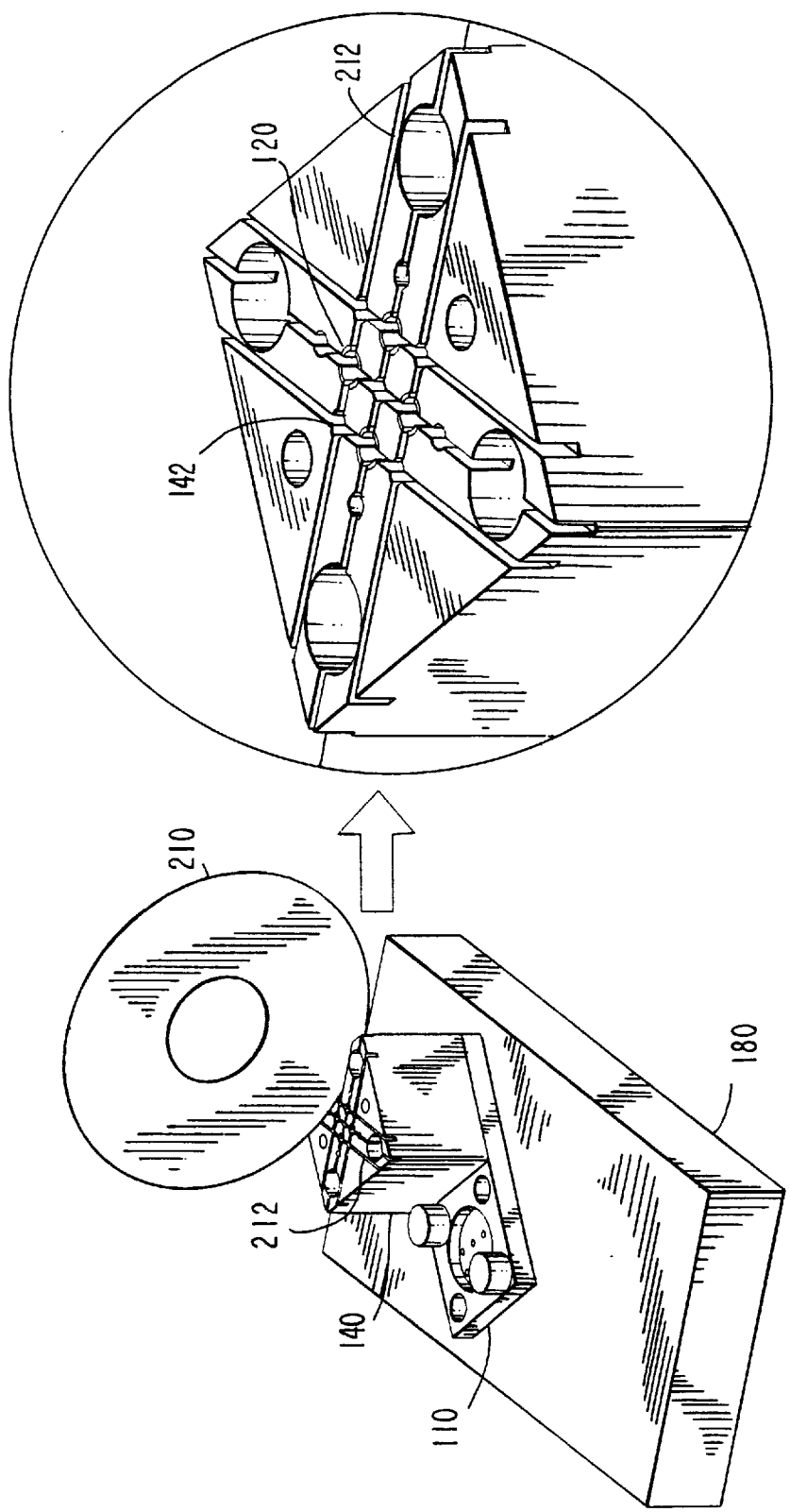
FIG. 23 is a perspective view showing the operation of cutting diagonal slits on the top face of the guide block.
FIG. 23a is an enlarged view of the top face of the guide block after the cutting operation.

FIG. 23 shows a 1.5 inch diameter by 0.012 inch thick solid carbide circular jewelers saw 210 being used to cut diagonal slits 212 0.055 inches deep across the top face of the guide block 140. FIG. 23a shows an enlarged view of the top of the guide block 140 and discloses that the slits 212 run from the fiber holes 142 to the inner guide tubes 120, thus allowing the optical fibers to lie from the fiber holes 142 to the inner guide tubes 120. The special assembly fixture 180 is designed to allow the test sensor 100 to be mounted at +45° or −45°, thus facilitating the diagonal slitting. Any sharp edges in the slits 212 that can ruin the fibers are removed by a manual deburring operation using thin brass strips.

The combination of the plate 110 and the guide block 140 are removed from the special assembly fixture 180. Then the guide block 140 is carefully separated from the plate 110, while not separating the inner guide tubes 120 from the plate 110.

Figure 24:
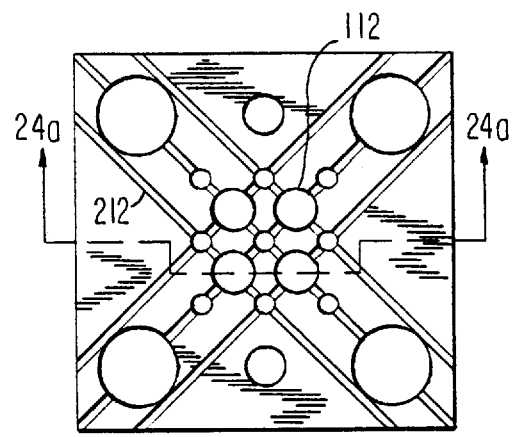
FIG. 24 is a plan view of the guide block after it has been modified.
Figure 24A:
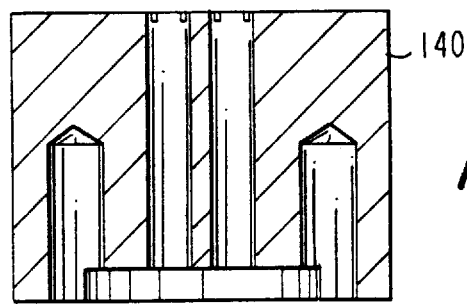
FIG. 24a is a cross-sectional elevation of the guide block.
Figure 24B:
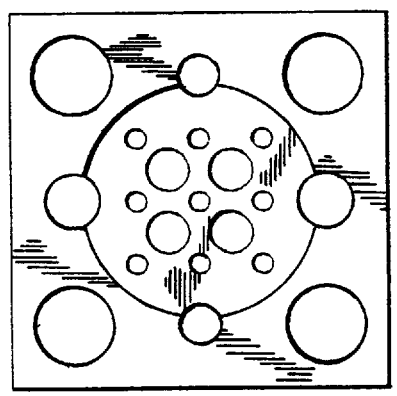
FIG. 24b is a bottom view of the guide block.

FIG. 24 shows the modification that is then performed on the guide block 140. A milling operation is performed on the top face of the guide block 140 removing 0.040 inches which decreases the depth of the slits 212 to 0.015 inches. The four holes 112 are redrilled and enlarged to 0.067 inches in diameter.

Figure 25:
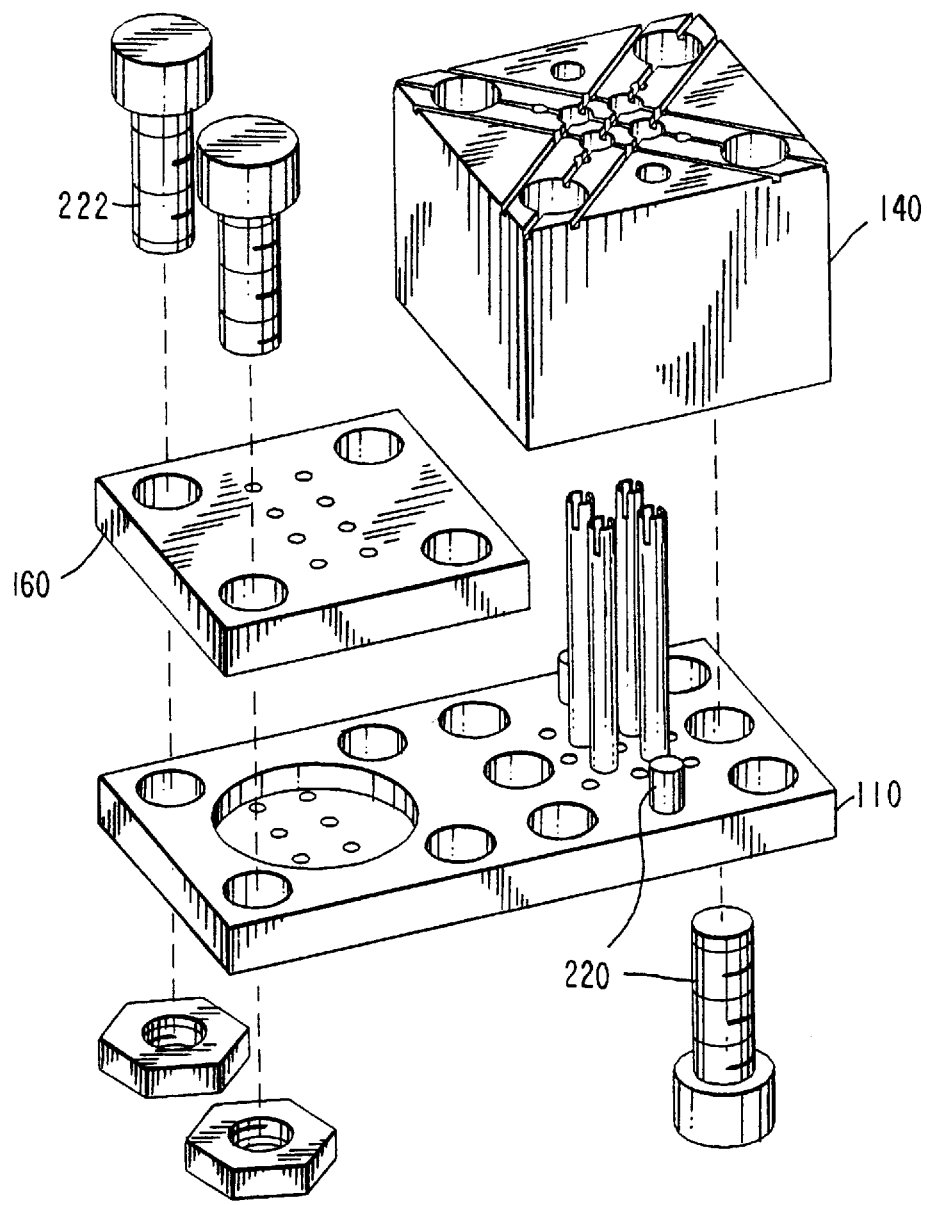
FIG. 25 is an exploded perspective view showing the reattachment of the guide block to the plate and attachment of a top cap to the plate.

FIG. 25 shows that the guide block 140 is then reattached to the plate 110 using pins and fasteners 220 from below. The top cap 160 is also attached to the plate 110 from above using fasteners 222.

Figure 26:
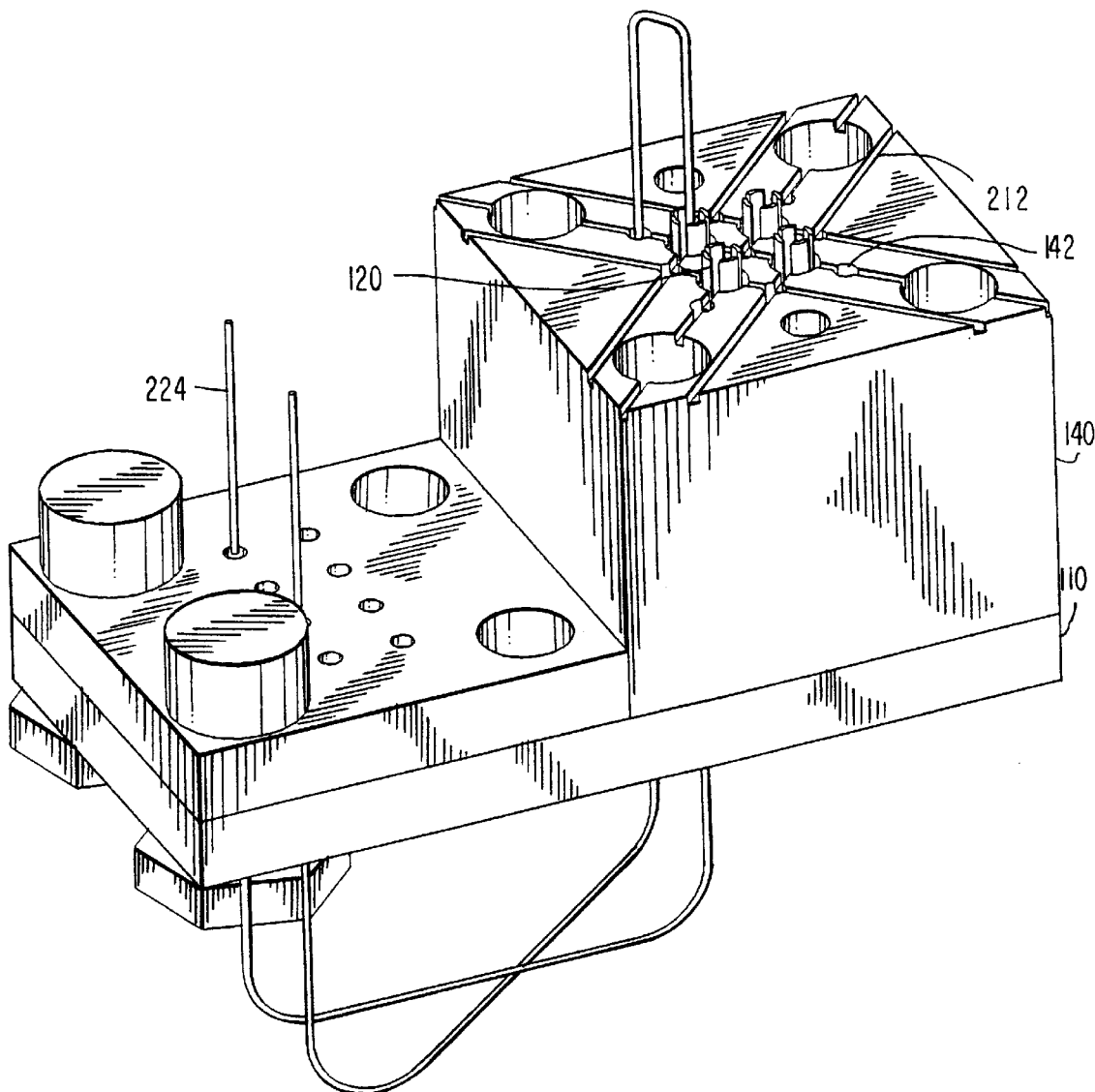
FIG. 26 is a perspective view showing, in part, the looping operation performed on an optical fiber.

FIG. 26 shows that a single optical fiber 224, approximately 1.5 meters in length, is continuously looped between the fiber holes 142 and the inner guide tubes 120 along the slits 212.

Figure 27:
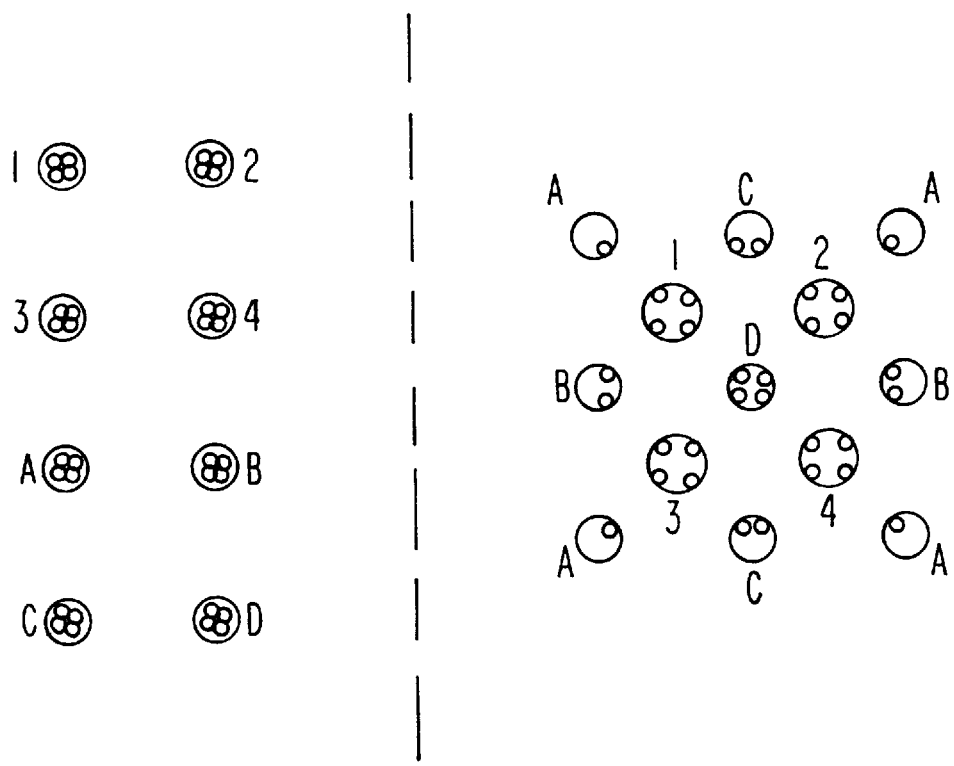
FIG. 27 is a schematic showing the order in which the looping operation is done.

FIG. 27 shows a schematic of the order in which the looping operation is done. This order is critical to the success of the construction of the test sensor array 100. The holes to the right of the dashed line are those on the top face of the guide block 140. The numbered holes are the four holes 112 for the transmit fibers 76 (FIG. 5) and the lettered holes are the fiber holes 142 for the receive fibers 78 (FIG. 5). The holes to the left of the dashed line are the eight holes 114 (FIG. 14b) on the plate 110. The correspondence of numbering and lettering between the holes on the right and left sides of the dashed line indicates the correct order for the looping operation.

Figure 28:
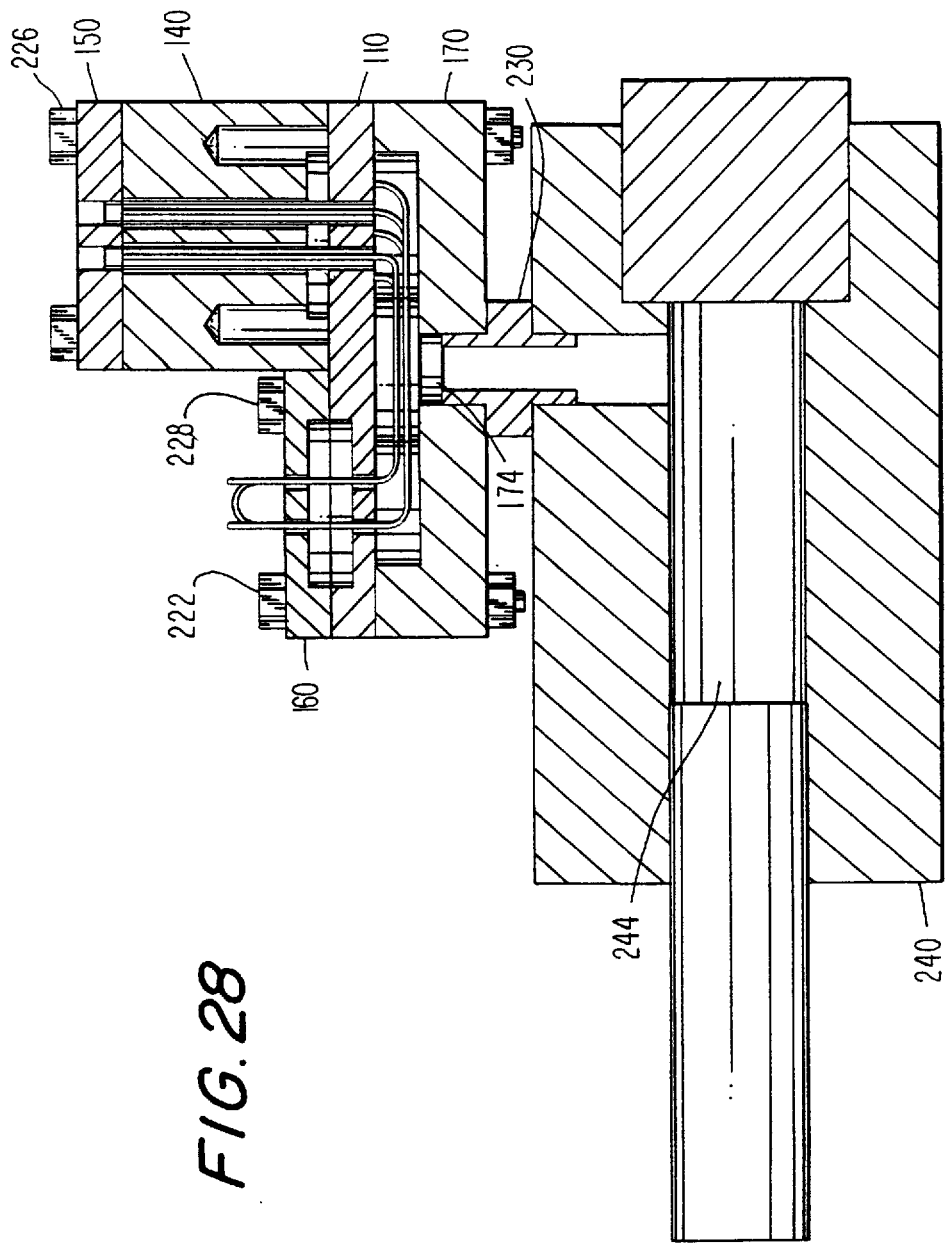
FIG. 28 is a cross-sectional elevation of the test sensor array with associated top caps and attached ram assembly during the operation of injecting adhesive and sealant into the sensor array.

The fasteners, 220 and 222, are removed and the top cap 150 and the bottom cap 170 are fastened to the guide block 140 and the plate 110 respectively with fasteners 226 and the top cap 160 is reattached to the plate 110 with fasteners 222 and 228. A fitting 230 is attached to the port 174 of the bottom cap 170 and is mounted onto a ram system 240 to inject a two-part epoxy adhesive and sealant 244 into the cavities of the test sensor array 100. The arrangement of the test sensor array with the aforementioned caps, fitting, and ram system attached is shown in FIG. 28. It is highly recommended to use a mixing nozzle designed to combine the two components of the epoxy without aeration.

The adhesive and sealant 244 chosen for injection must be chemically compatible with the optical fibers, have low viscosity for easy injection, be specially formulated in a dark color to minimize unwanted light transmission, and possess high bonding and structural strength to support the fiber ends. A two component low viscosity polysulfide and epoxy based adhesive and sealant, formulated in a black color and able to cure at room temperature in 24 hours, is easily available from chemical manufacturers. The adhesive and sealant 244 is necessary to eliminate leakage and pressure loss which would prevent the sensor 8 from operating pneumatically.

Figure 29A:
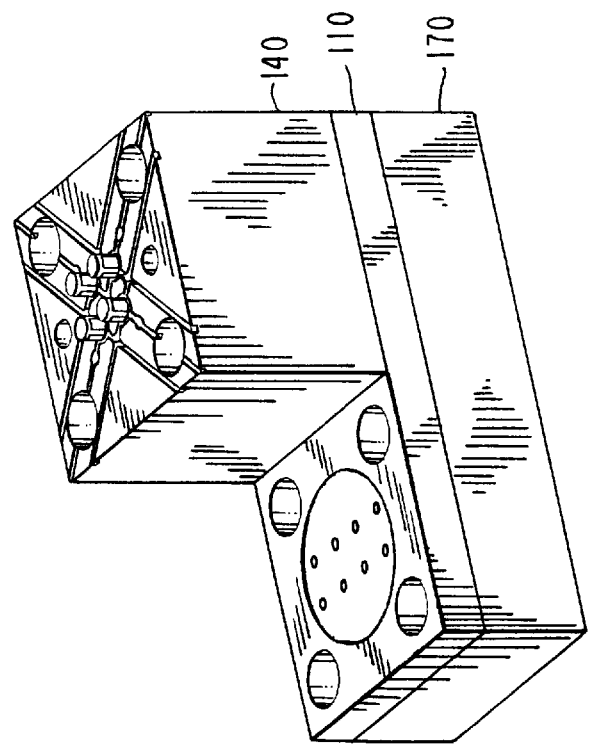
FIG. 29a is a perspective view showing the sensor array after the grinding operation.
Figure 29:
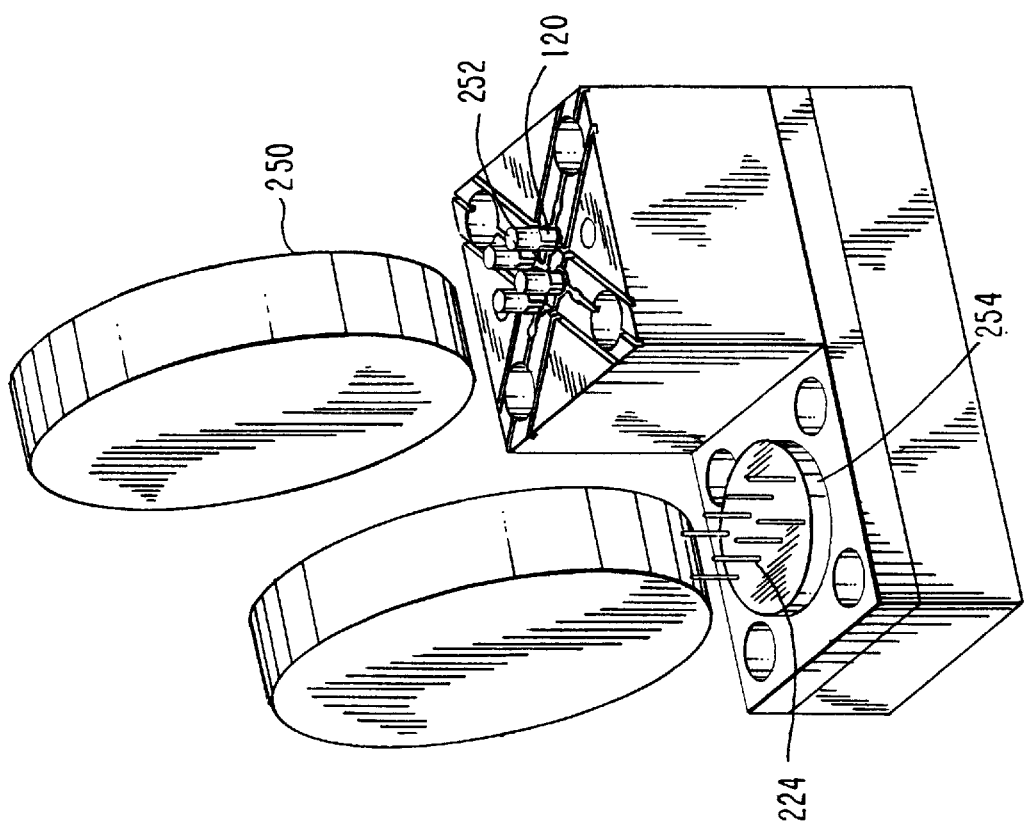
FIG. 29 is a perspective view showing the sensor array before a grinding operation to remove excess adhesive and sealant.

FIGS. 29 and 29a show the state of the test sensor array 100 before and after the grinding operation done after the adhesive and sealant 244 has reached fall cure. The fasteners, 222, 226, and 228, and top caps, 150 and 160, are removed leaving small cylinders of excess epoxy 252 above the inner guide tubes 120 and a large epoxy nipple 254 at the holes 114 (FIG. 14b) for the emitters 72 (FIG. 5) and photodetectors 74 (FIG. 5). Both the cylinders 252 and the nipple 254 are ground down with a grinding device 250. The cylinders 252 are ground down to just above the inner guide tubes 120 and the nipple 254 is ground down to the plate 110 and then wet polished to improve the light transmission of the fiber 224.

Figure 30:
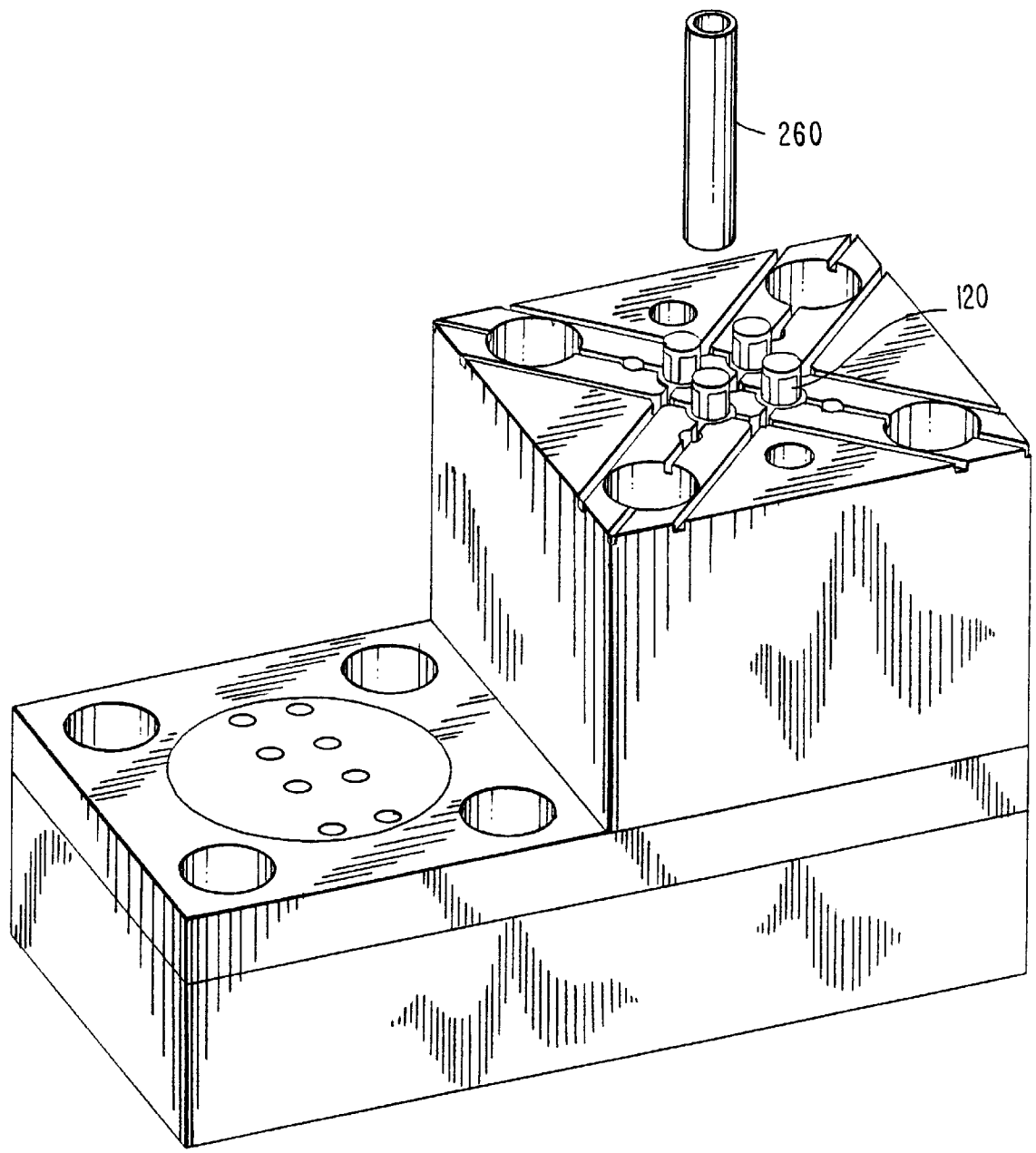
FIG. 30 is a perspective view showing a hole saw cutting holes around the inner guide tubes.

FIG. 30 shows the final step in the construction of the test sensor array 100. A tiny hardened steel hole saw 260 cuts the adhesive and sealant 244 and the fiber 224 in a circular pattern around the inner guide tubes 120 to provide clearance for the encoder tube 20.

FIG. 31 shows two sensors 8 according to the present invention in operation integrated into the right and left fingers, 280 and 290, of a robotic parallel gripper gripping an object 300. The sensors 8 operate by first contacting the object to be gripped 300 with their bearing plates 12 and then extending their probe subassemblies 10 pneumatically until the surface of the object 300 is contacted or until the maximum travel of the probe, 0.4 inches, is reached.

During the extension of the probe subassemblies, data can be continuously gathered from each sensor 8 by a computer scanning all sixty four (64) probe subassemblies 10 in each sensor 8 by the process previously described in connection with FIG. 11.

When the probe subassemblies 10 have come to rest either because they have contacted the surface of the object 300 or because they have reached their maximum extension, two tactile images of the object 300 are available. These tactile images can be used to construct a composite image of the object 300, given the spatial displacement between the tactile images based upon the displacement between the right and left fingers, 280 and 290, of the robotic parallel gripper.

While preferred embodiments of the present invention have been described in detail, various modifications, alterations and changes may be made without departing from the spirit and scope of the present invention as defined in the following claims.

What is claimed is:

1. A sensor for the flexible gripping of objects comprising:
   a. a plurality of means for contacting and gripping said objects;
   b. means for enclosing at least a portion of said plurality of means for contacting and gripping said objects, said objects being located exterior to said means for enclosing; and
   c. means for converting displacements of said plurality of means for contacting and gripping said objects to digital signals, said displacements being produced when each of said plurality of means for contacting and gripping said objects are extended and contact an object to be gripped or reach a maximum extension, said means for converting displacements operating by the transmission and nontransmission of signals as a function of said displacements.

2. A sensor for the flexible gripping of objects as claimed in claim 1, wherein each one of said plurality of means for contacting and gripping said objects comprises:
   a. a probe;
   b. a retainer tube, a first end of which is immovably attached to said probe; and
   c. an encoder tube immovably attached to a second end of said retainer tube.

3. A sensor for the flexible gripping of objects as claimed in claim 1, wherein said means for enclosing at least a portion of said plurality of means for contacting and gripping said objects comprises:
   a. a bearing plate having a plurality of holes which retain said plurality of means for contacting and gripping said objects in an initially retracted position, when said bearing plate first contacts an object, and through which holes said plurality of means for contacting and gripping said objects pass to contact and grip said object after said bearing plate contacts said object;
   b. a housing adapted to house a portion of the length of each of said plurality of means for contacting and gripping said objects in said initially retracted position and through which each of said plurality of means for contacting and gripping said objects can pass to contact and grip said object; and
   c. a sensor array adapted to permit a portion of the length of each of said plurality of means for contacting and gripping said objects to pass through said sensor array.

4. A sensor for the flexible gripping of objects as claimed in claim 2, wherein said means for converting displacements of said plurality of means for contacting and gripping said objects to digital signals comprises:
   a. a plurality of photodetection circuits adapted to convert displacements of said plurality of means for contacting and gripping said objects to optical signals; and
   b. a communications hardware circuit comprising a plurality of said photodetection circuits and receiving means, decoding means, and transmitting means for gathering and storing said optical signals from said sensor in the form of digital signals.

5. A sensor for the flexible gripping of objects as claimed in claim 1, wherein said plurality of means for contacting and gripping said objects are disposed in a two-dimensional array.

6. A sensor for the flexible gripping of objects as claimed in claim 4, wherein each of said plurality of photodetection circuits comprises:
   a. an emitter containing an emitter circuit;
   b. a transmit fiber transmitting optical signals from said emitter circuit;
   c. a photodetector containing a detector circuit; and
   d. a receive fiber receiving said optical signals from said transmit fiber and conducting said optical signals to said detector circuit.

7. A sensor for the flexible gripping of objects as claimed in claim 6, wherein said emitter circuit comprises an infrared light emitting diode, said optical signals being comprised of infrared light.

8. A sensor for the flexible gripping of objects as claimed in claim 6, wherein said transmit fiber and said receive fiber are composed of plastic.

9. A sensor for the flexible gripping of objects as claimed in claim 7, wherein said detector circuit includes an operational amplifier allowing said detector circuit to successfully detect said infrared light from said receive fiber.

10. A sensor for the flexible gripping of objects as claimed in claim 6, wherein said receiving means of said communications hardware circuit comprise optocouplers, said decoding means of said communications hardware circuit comprise decoders, and said transmitting means of said communications hardware circuit comprise optocouplers.

11. A sensor for the flexible gripping of objects as claimed in claim 10, wherein said communications hardware circuit utilizes said optocouplers and decoders to receive and decode, respectively, row and column addresses energizing a particular one of said emitters, said emitters being disposed in a two-dimensional array.

12. A sensor for the flexible gripping of objects as claimed in claim 9, wherein said encoder tube has a pattern of slots and holes so disposed therein as to selectively transmit or block transmission of said infrared light from a plurality of said transmit fibers to a plurality of said receive fibers, depending on the position of said one of said plurality of means for contacting and gripping said objects comprising said encoder tube.

13. Two sensors for the flexible gripping of objects, one of each of said two sensors being integrated into right and left fingers, respectively, of a robotic parallel gripper, each of said two sensors being as claimed in claim 1.

14. A process for constructing a sensor array comprising:
 a. pressing inner guide tubes into place in a plurality of holes in a plate and a guide block;
 b. cutting diagonal slits across the top of said guide block, said slits intersecting an array of holes to contain said inner guide tubes and a plurality of transmit fibers and an array of holes to contain receive fibers;
 c. continuously looping a single optical fiber between said array of holes to contain said inner guide tubes and said transmit fibers and said array of holes to contain said receive fibers, such that said fiber lies in said slits;
 d. injecting an adhesive and sealing means to fill all the cavities in said sensor array; and
 e. cutting in a circular pattern said adhesive and sealing means and said optical fiber at each of the holes in said array of holes in said guide block and said plate to contain said inner guide tubes and said transmit fibers.

15. A process according to claim 14, wherein said single optical fiber utilized in said looping operation is comprised of plastic.

16. A process according to claim 14, wherein said injection operation employs a ram system and mixing nozzle.

17. A process according to claim 14, wherein said adhesive and sealing means is formulated in a black color, and is able to cure at room temperature in 24 hours.

18. A process according to claim 14, wherein said adhesive and sealing means is low viscosity and comprises a polysulfide and epoxy mixture.

19. A process according to claim 14 wherein said cutting operation is performed such that said circular pattern produced provides a passage for the movement of an encoder tube.

* * * * *